United States Patent
Lee et al.

(10) Patent No.: US 9,084,272 B2
(45) Date of Patent: Jul. 14, 2015

(54) APPARATUS AND METHOD FOR TRANSMITTING/RECEIVING REFERENCE SIGNAL TRANSMISSION INFORMATION IN CELLULAR RADIO COMMUNICATION SYSTEM USING COOPERATIVE MULTI-POINT SCHEME

(71) Applicant: Samsung Electronics Co., Ltd., Suwon-si, Gyeonggi-do (KR)

(72) Inventors: Hyo-Jin Lee, Suwon-si (KR); Youn-Sun Kim, Seongnam-si (KR); Ki-Il Kim, Yongin-si (KR); Ju-Ho Lee, Suwon-si (KR); Hyoung-Ju Ji, Seoul (KR); Seung-Hoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/726,969

(22) Filed: Dec. 26, 2012

(65) Prior Publication Data
US 2013/0163569 A1    Jun. 27, 2013

(30) Foreign Application Priority Data

Dec. 26, 2011 (KR) .................. 10-2011-0142748
Mar. 16, 2012 (KR) .................. 10-2012-0027405
Mar. 29, 2012 (KR) .................. 10-2012-0032295

(51) Int. Cl.
*H04W 72/08*    (2009.01)
*H04L 1/00*     (2006.01)
*H04L 5/00*     (2006.01)
(Continued)

(52) U.S. Cl.
CPC ........... *H04W 72/085* (2013.01); *H04L 1/0045* (2013.01); *H04L 1/0072* (2013.01); *H04L 1/0077* (2013.01); *H04L 5/0035* (2013.01);
(Continued)

(58) Field of Classification Search
CPC ............ H04W 72/0406; H04W 72/04; H04W 72/0413; H04W 28/04
USPC ............... 370/312, 329, 366; 455/450, 452.1, 455/422.1
See application file for complete search history.

(56) References Cited

U.S. PATENT DOCUMENTS

2010/0323684 A1  12/2010  Cai et al.
2011/0286376 A1  11/2011  Yoo et al.
2012/0027110 A1*  2/2012  Han et al. .................. 375/260
(Continued)

FOREIGN PATENT DOCUMENTS

WO    2010/117236 A2    10/2010
WO    2011/071291 A2    6/2011
WO    2011/087272 A2    7/2011

*Primary Examiner* — Dady Chery
(74) *Attorney, Agent, or Firm* — Jefferson IP Law, LLP

(57) ABSTRACT

An apparatus and method for transmitting/receiving reference signal transmission information in a cellular radio communication system using a Cooperative Multi-Point (CoMP) scheme is provided. In the reference signal transmission information transmission method, a Central Control Apparatus (CCA) transmits measurement set information related to a measurement set including at least one reference signal resource unit through which a reference signal is transmitted, and reference signal transmission timing information including information related to a timing at which the reference signal is transmitted to a User Equipment (UE), and transmits reference signal non-transmission timing information including information related to a timing at which the reference signal is not transmitted through the reference signal resource unit to the UE.

52 Claims, 9 Drawing Sheets

(51) Int. Cl.
*H04W 48/12* (2009.01)
*H04W 48/16* (2009.01)

(52) U.S. Cl.
CPC .............. *H04L 5/0048* (2013.01); *H04W 48/12* (2013.01); *H04W 48/16* (2013.01)

(56) References Cited

U.S. PATENT DOCUMENTS

2012/0057516 A1 3/2012 Ahn et al.
2012/0230290 A1 9/2012 Seo et al.

\* cited by examiner

APPARATUS AND METHOD FOR TRANSMITTING/RECEIVING REFERENCE SIGNAL TRANSMISSION INFORMATION IN CELLULAR RADIO COMMUNICATION SYSTEM USING COOPERATIVE MULTI-POINT SCHEME

PRIORITY

This application claims the benefit under 35 U.S.C. §119 (a) of a Korean patent application filed on Dec. 26, 2011 in the Korean Intellectual Property Office and assigned Serial No. 10-2011-0142748, a Korean Patent Application filed on Mar. 16, 2012 in the Korean Intellectual Property Office and assigned Serial No. 10-2012-0027405, and a Korean Patent Application filed on Mar. 29, 2012 in the Korean Intellectual Property Office and assigned Serial No. 10-2012-0032295, the entire disclosure of which is hereby incorporated by reference.

BACKGROUND OF THE INVENTION

1. Field of the Invention

The present invention relates to an apparatus and method for transmitting/receiving reference signal transmission information in a cellular radio communication system. More particularly, the present invention relates to an apparatus and method for transmitting/receiving reference signal transmission information in a Cooperative Multi-Point (CoMP) cellular radio communication system in which a plurality of Base Stations (BSs) provide a Mobile Station (MS) with a service using a CoMP scheme.

2. Description of the Related Art

Cellular radio communication systems have evolved to provide various high-speed large-capacity services to MSs. A typical example of the cellular radio communication system may include a High Speed Downlink Packet Access (HSDPA) mobile communication system, a High Speed Uplink Packet Access (HSUPA) mobile communication system, a Long-Term Evolution (LTE) mobile communication system, a Long-Term Evolution Advanced (LTE-A) mobile communication system, a High Rate Packet Data (HRPD) mobile communication system proposed in a 3rd Generation Project Partnership 2 (3GPP2), and an Institute of Electrical and Electronics Engineers (IEEE) 802.16m mobile communication system.

The LTE mobile communication system has been developed to effectively support a high-speed radio packet data transmission, and may maximize a throughput of a cellular radio communication system using various Radio Access (RA) schemes. The LTE-A mobile communication system enhances the LTE mobile communication system, and has an enhanced transmission capability compared with the LTE mobile communication system.

A 3rd Generation (3G) radio packet data communication system according to the related art, such as the HSDPA mobile communication system, the HSUPA mobile communication system and the HRPD mobile communication system, uses schemes such as an Adaptive Modulation and Coding (AMC) scheme and a channel adaptation scheduling scheme in order to enhance a transmission efficiency. When using the AMC scheme and the channel adaptation-scheduling scheme, a signal transmission apparatus may use an optimal modulation scheme and coding scheme in the most efficient timing point by receiving partial channel status feedback information from a signal reception apparatus.

In a radio packet data communication system using the AMC scheme, a signal transmission apparatus may adjust amount of data packets to be transmitted according to channel status. If the channel status is bad, the signal transmission apparatus may keep a reception error probability in a target reception error probability which the signal transmission apparatus targets by decreasing the amount of data packets to be transmitted. On the other hand, if the channel status is good, the signal transmission apparatus may keep the reception error probability in the target reception error probability and effectively transmit many data packets by increasing the amount of data packets to be transmitted.

In a radio packet data communication system using the channel adaptation-scheduling scheme, the signal transmission apparatus selects an MS having good channel status among a plurality of MSs, and provides the selected MS with a service. System throughput accordingly increases compared with a case that the signal transmission apparatus allocates a channel to an arbitrary MS, and provides the arbitrary MS with the service. Such system throughput increase is called as a 'multi-user diversity gain'.

If the AMC scheme is used with a Multiple Input Multiple Output (MIMO) scheme, the AMC scheme may include a function for determining the number of spatial layers or a rank. In this case, the radio packet data communication system using the AMC scheme considers the number of layers to which packet data is transmitted using the MIMO scheme as well as a code rate and a modulation scheme in order to determine an optimal data rate.

Generally, if an Orthogonal Frequency Division Multiple Access (OFDMA) scheme is used, a system throughput increase is expected compared with a case in which a Code Division Multiple Access (CDMA) scheme is used.

The reason why the system throughput is increased if the OFDMA scheme is used is that a radio packet data communication system may perform a frequency domain-scheduling scheme. The radio packet data communication system may acquire more throughput gains upon using a characteristic of which channel status is varied according to a frequency like a case in which the radio packet data communication system acquires a throughput gain using the channel adaptation-scheduling scheme according to a characteristic of which channel status is varied according to time. Accordingly, in the next generation cellular radio communication system, techniques for changing the CDMA scheme used in a 2G cellular radio communication system and a 3G cellular radio communication system to the OFDMA scheme have been actively studied. The 3GPP and the 3GPP2 have started a standard project related to an enhanced cellular radio communication system using the OFDMA scheme.

FIG. 1 schematically illustrates a structure of a radio frame in an LTE-A mobile communication system according to the related art.

Referring to FIG. 1, 1 radio frame includes 10 sub-frames, and each of 10 sub-frames includes 2 slots. Indexes 0 to 9 are allocated to 10 sub-frames included in 1 radio frame, and indexes 0 to 19 are allocated to 20 slots included in 1 sub-frame.

FIG. 2 schematically illustrates a structure of a cellular radio communication system according to the related art.

Referring to FIG. 2, in a cellular radio communication system, a transmission/reception antenna is arranged at a center in each cell. In a cellular radio communication system including a plurality of cells, a particular User Equipment (UE) receives a radio communication service using a plurality of schemes as described above from a selected cell during a relatively long time, i.e., a semi-static time interval. For example, it will be assumed that the cellular radio communication system includes 3 cells, i.e., a cell 100, a cell 110 and a cell 120. The cell 100 provides a radio communication service to a UE 101 and a UE 102, the cell 110 provides a radio communication service to a UE 111, and the cell 120 provides a radio communication service to a UE 121. BSs 130, 131 and 132 manage the respective cells 100, 110 120.

The UE 102 receiving the radio communication service using the cell 100 is located at a point relatively distant from the BS 130 compared with the UE 101. The UE 102 suffers from a relatively large interference from the BS 132 managing a service region of the cell 120, so the UE 102 receives data at a relatively slow data rate.

If the cells 100, 110, and 120 independently provide a radio communication service, a BS managing a service region of each of the cells 100, 110, and 120 transmits a Reference Signal (RS) in order that a particular UE measures downlink channel status of each of the cells 100, 110 and 120. If the cellular radio communication system is a 3GPP LTE-A mobile communication system, the RS is a Channel Status Information Reference Signal (CSI-RS).

FIG. 3 schematically illustrates location on which a CSI-RS is transmitted in a resource block in a LTE-A mobile communication system according to the related art. Each block in FIG. 3 indicates a Resource Element (RE) included in a resource block.

Referring to FIG. 3, in each of REs 200-219, CSI-RSs for distinguishing 2 CSI-RS antenna ports may be transmitted. A particular BS broadcasts 2 CSI-RSs for a downlink measurement through a RE 200. As described in FIG. 2, in a cellular radio communication system including a plurality of cells, each cell allocates a RE included in a resource block, and a CSI-RS is transmitted through the allocated RE. For example, in FIG. 2, a CSI-RS may be transmitted through the RE 200 in the cell 100, a CSI-RS may be transmitted through a RE 205 in the cell 110, and a CSI-RS may be transmitted through a RE 210 in the cell 120. As described above, in a LTE-A mobile communication system according to the related art, the reason why each cell transmits a CSI-RS using a different time resource and a different frequency resource is to prevent a mutual interference between CSI-RSs.

A sub-frame through a CSI-RS is transmitted may be determined using an $I_{CSI-RS}$ as a parameter transmitted through a Radio Resource Control (RRC) message. Upon receiving the $I_{CSI-RS}$, a UE determines $T_{CSI-RS}$ as a sub-frame period of a sub-frame through which a CSI-RS is transmitted and $\Delta_{CSI-RS}$ as an offset of the sub-frame through which the CSI-RS is transmitted using Table 1.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

The UE receives a CSI-RS through a sub-frame satisfying a criteria expressed in Equation (1).

$$(10n_f + \lfloor n_s/2 \rfloor - \Delta_{CSI-RS}) \bmod T_{CSI-RS} = 0 \qquad (1)$$

In Equation 1, $n_f$ denotes a Radio Frame Number (RFN), and $n_s$ denotes a slot number included in a radio frame. In an LTE-A mobile communication system, even though a particular sub-frame is determined as a sub-frame through which a CSI-RS is transmitted using Equation (1), the CSI-RS is not transmitted through the particular sub-frame in the following 3 cases:

1. a sub-frame through which at least one of a synchronization signal, a Physical Broadcast CHannel (PBCH) signal, and a System Information Block type 1 (SIB1) message is transmitted;
2. a sub-frame through which a paging message is transmitted; and
3. a sub-frame through which an SIB2 message to an SIB13 message are transmitted.

For example, the synchronization signal is transmitted through a sub-frame 0 and a sub-frame 5, the PBCH signal is transmitted through a sub-frame 0, and the SIB1 message is transmitted through a sub-frame 5 included in each of a radio frame satisfying a criteria of $n_f$ mod 8=0 to a radio frame satisfying a criteria of $n_f$ mod 2=0. The SIB1 message is transmitted by 80 [ms].

If the cellular radio communication system is a Frequency Division Duplexing (FDD) mobile communication system, a sub-frame through which a paging message is transmitted is set as one of a paging SFN set {9}, a paging SFN set {4, 9}, and a paging SFN set {0, 4, 5, 9} in a related radio frame by one of paging cycles 10 [ms], 20 [ms], 40 [ms], 80 [ms], 160 [ms] and 320 [ms]. A BS determines the paging cycle and the paging SFN set, and transmits the determined paging cycle and paging SFN set to UEs in a cell using a RRC message.

If the cellular radio communication system is a Time Division Duplexing (TDD) mobile communication system, a sub-frame through which a paging message is transmitted is determined using one of a paging SFN set {0}, a paging SFN set {0, 5}, and a paging SFN set {0, 1, 5, 6}. A BS determines one of the paging SFN set {0}, the paging SFN set {0, 5}, and the paging SFN set {0, 1, 5, 6}, and transmits the determined paging SFN set to UEs in a cell using an RRC message.

In the FDD and TDD mobile communication systems, an RRC message including information related to a sub-frame through which a paging message is transmitted includes a paging parameter including at least one of defaultPagingCycle information as paging cycle information and paging additional information (nB) included in an SIB2 message. The sub-frame through which the paging message is transmitted is determined using the defaultPagingCycle information and the nB in order to satisfy a criteria of Ns=max(1, nB/defaultPagingCycle). A relationship between the Ns and the paging cycle information is expressed in Table 2.

TABLE 2

| Ns | FDD | TDD |
|---|---|---|
| 1 | {9} | {0} |
| 2 | {4, 9} | {0, 5} |
| 4 | {0, 4, 5, 9} | {0, 1, 5, 6} |

A sub-frame through which system information is transmitted is dynamically scheduled within a particular time window set as an SIB transmission period determined by a BS.

A size of a time window for transmitting the system information is determined based on a system information window length (si-WindowLength) parameter. An SIB transmission period for each of an SIB2 message to an SIB13 message for each SIB set is determined based on a system information period (si-Periodicity) parameter.

The si-WindowLength parameter and the si-Periodicity parameter as an upper layer signal are included in an SIB1 message, and the si-WindowLength parameter is commonly applied to all system information. The SIB set denotes a set of system information which is transmitted by the same period, and includes at least one of the SIB2 message to the SIB13 message. An example of an SIB type and an SIB period is expressed in Table 3.

TABLE 3

|  | SIB type | SIB period |
|---|---|---|
| SIB set 1 | SIB2, SIB3, SIB4 | 80 ms |
| SIB set 2 | SIB5, SIB6 | 160 ms |
| SIB set 3 | SIB8 | 320 ms |

In an LTE-A mobile communication system where a transmission/reception antenna is arranged at the center of each cell, a UE may determine an SFN by detecting a synchronization signal and determine sub-frames through which a CSI-RS is transmitted and sub-frames, through which a CSI-RS is not transmitted, which collide with sub-frames through which a paging signal and system information are transmitted by receiving a PBCH signal and SIB messages.

In a cellular radio communication system in FIG. 2, there is a limitation for providing a high data rate to a UE located at a cell boundary due to interference from another cell. A data rate for a high speed-data service is strongly influenced by a location of a UE. In a cellular radio communication system according to the related art, it is possible that a relatively high data rate is provided to a UE located at a relatively close to a cell center; however, it is difficult to provide a high data rate to a UE located at relatively distant from a cell center.

In the LTE-A mobile communication system, a CoMP scheme in which a plurality of cells provide a communication service to a particular UE using a cooperation scheme has been proposed in order to provide a high data rate to a UE located at a cell boundary, and enlarge a service region providing the high data rate.

In the LTE-A mobile communication system, there is a need for distinguishing a sub-frame through which a CSI-RS is transmitted among sub-frames transmitted from a plurality of cells and a sub-frame through which a CSI-RS is not transmitted among the sub-frames in order that the UE effectively estimates channel status.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide apparatus and method for transmitting/receiving reference signal transmission information in a cellular radio communication system.

Another aspect of the present invention is to provide an apparatus and method for transmitting/receiving reference signal transmission information in a cellular radio communication system in which a signal reception apparatus receives a reference signal at a timing which does not collide with a timing at which a paging message is transmitted.

Another aspect of the present invention is to provide an apparatus and method for transmitting/receiving reference signal transmission information in a cellular radio communication system in which a signal reception apparatus receives a reference signal at a timing which does not collide with a timing at which system information is transmitted.

Another aspect of the present invention is to provide an apparatus and method for transmitting/receiving reference signal transmission information in a cellular radio communication system in which a signal reception apparatus receives a reference signal at a timing which does not collide with a timing at which a synchronization signal is transmitted.

Another aspect of the present invention is to provide an apparatus and method for transmitting/receiving reference signal transmission information in a cellular radio communication system thereby a signal reception apparatus receives a reference signal at a timing which is not collided with a timing at which a Physical Broadcast CHannel (PBCH) signal is transmitted.

Another aspect of the present invention is to provide an apparatus and method for transmitting/receiving reference signal transmission information on reference signals transmitted by a plurality of signal transmission apparatuses in a cellular radio communication system.

Another aspect of the present invention is to provide an apparatus and method for transmitting/receiving reference signal transmission information in a cellular radio communication system in which a signal reception apparatus receives reference signals transmitted by a plurality of signal transmission apparatuses at a timing which does not collide with a timing at which a paging message is transmitted.

Another aspect of the present invention is to provide an apparatus and method for transmitting/receiving reference signal transmission information in a cellular radio communication system in which a signal reception apparatus receives reference signals transmitted by a plurality of signal transmission apparatuses at a timing which does not collide with a timing at which system information is transmitted.

Another aspect of the present invention is to provide an apparatus and method for transmitting/receiving reference signal transmission information in a cellular radio communication system in which a signal reception apparatus receives reference signals transmitted by a plurality of signal transmission apparatuses at a timing which does not collide with a timing at which a synchronization signal is transmitted.

Another aspect of the present invention is to provide an apparatus and method for transmitting/receiving reference signal transmission information in a cellular radio communication system in which a signal reception apparatus receives reference signals transmitted by a plurality of signal transmission apparatuses at a timing which does not collide with a timing at which a PBCH signal is transmitted.

Another aspect of the present invention is to provide an apparatus and method for receiving a reference signal in a cellular radio communication system.

Another aspect of the present invention is to provide an apparatus and method for receiving a reference signal at a timing which does not collide with a timing at which a paging message is transmitted in a cellular radio communication system.

Another aspect of the present invention is to provide an apparatus and method for receiving a reference signal at a timing which does not collide with a timing at which system information is transmitted in a cellular radio communication system.

Another aspect of the present invention is to provide an apparatus and method for receiving a reference signal at a timing which does not collide with a timing at which a synchronization signal is transmitted in a cellular radio communication system.

Another aspect of the present invention is to provide an apparatus and method for receiving a reference signal at a timing which does not collide with a timing at which a PBCH signal is transmitted in a cellular radio communication system.

Another aspect of the present invention is to provide an apparatus and method for receiving reference signals transmitted by a plurality of signal transmission apparatuses in a cellular radio communication system.

Another aspect of the present invention is to provide an apparatus and method for receiving each of reference signals transmitted by a plurality of signal transmission apparatuses at a timing which does not collide with a timing at which a paging message is transmitted in a cellular radio communication system.

Another aspect of the present invention is to provide an apparatus and method for receiving reference signals transmitted by a plurality of signal transmission apparatuses at a timing which does not collide with a timing at which system information is transmitted in a cellular radio communication system.

Another aspect of the present invention is to provide an apparatus and method for receiving reference signals transmitted by a plurality of signal transmission apparatuses at a timing which does not collide with a timing at which a synchronization signal is transmitted in a cellular radio communication system.

Another aspect of the present invention is to provide an apparatus and method for receiving reference signals transmitted by a plurality of signal transmission apparatuses at a timing which does not collide with a timing at which a PBCH signal is transmitted in a cellular radio communication system.

In accordance with an aspect of the present invention, a method for transmitting reference signal transmission information by a Central Control Apparatus (CCA) in a cellular radio communication system using a Cooperative Multi-Point (CoMP) scheme is provided. The method includes transmitting measurement set information related to a measurement set including at least one reference signal resource unit through which a reference signal is transmitted, and reference signal transmission timing information including information related to a timing at which the reference signal is transmitted to a User Equipment (UE), and transmitting reference signal non-transmission timing information including information related to a timing at which the reference signal is not transmitted through the reference signal resource unit to the UE.

In accordance with another aspect of the present invention, a method for receiving reference signal transmission information by a UE in a cellular radio communication system using a CoMP scheme is provided. The method includes receiving measurement set information related to a measurement set including at least one reference signal resource unit through which a reference signal is transmitted, and reference signal transmission timing information including information related to a timing at which the reference signal is transmitted from a CCA, and receiving non-transmission timing information including information related to a timing at which the reference signal is not transmitted through the reference signal resource unit from the CCA.

In accordance with another aspect of the present invention, a CCA in a cellular radio communication system using a CoMP scheme is provided. The CCA includes a communication unit for transmitting measurement set information related to a measurement set including at least one reference signal resource unit through which a reference signal is transmitted, and reference signal transmission timing information including information related to a timing at which the reference signal is transmitted to a UE, and for transmitting reference signal non-transmission timing information including information related to a timing at which the reference signal is not transmitted through the reference signal resource unit to the UE.

In accordance with another aspect of the present invention, a UE in a cellular radio communication system using a CoMP scheme is provided. The UE includes a communication unit for receiving measurement set information related to a measurement set including at least one reference signal resource unit through which a reference signal is transmitted, and reference signal transmission timing information including information related to a timing at which the reference signal is transmitted from a CCA, and for receiving non-transmission timing information including information related to a timing at which the reference signal is not transmitted through the reference signal resource unit from the CCA.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
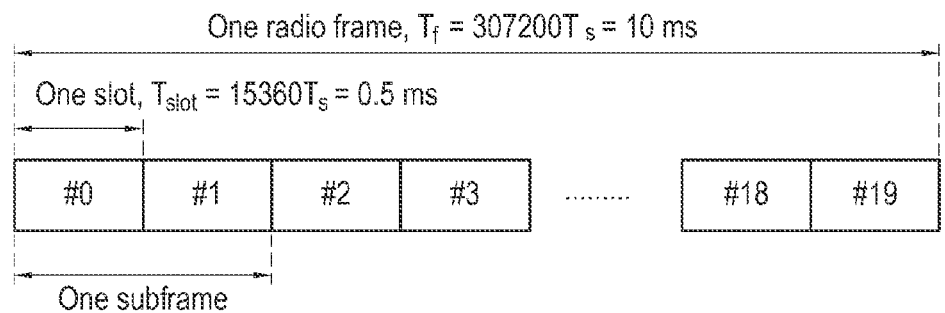
FIG. 1 schematically illustrates a structure of a radio frame in a LTE-A mobile communication system according to the related art.
Figure 2:
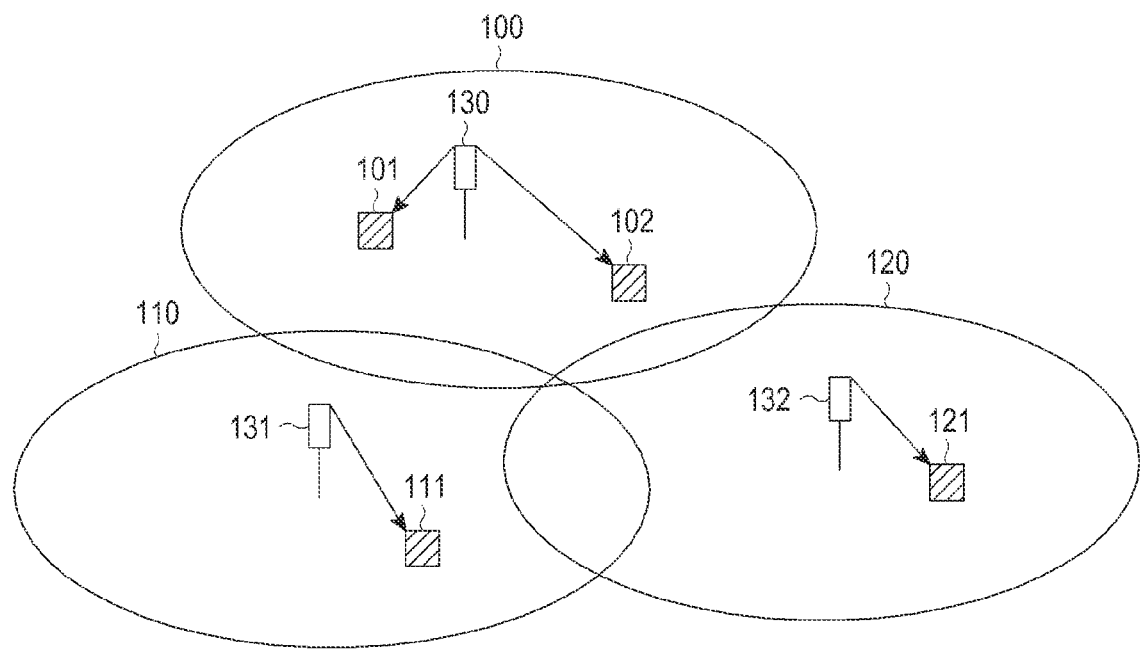
FIG. 2 schematically illustrates a structure of a cellular radio communication system according to the related art.
Figure 3:
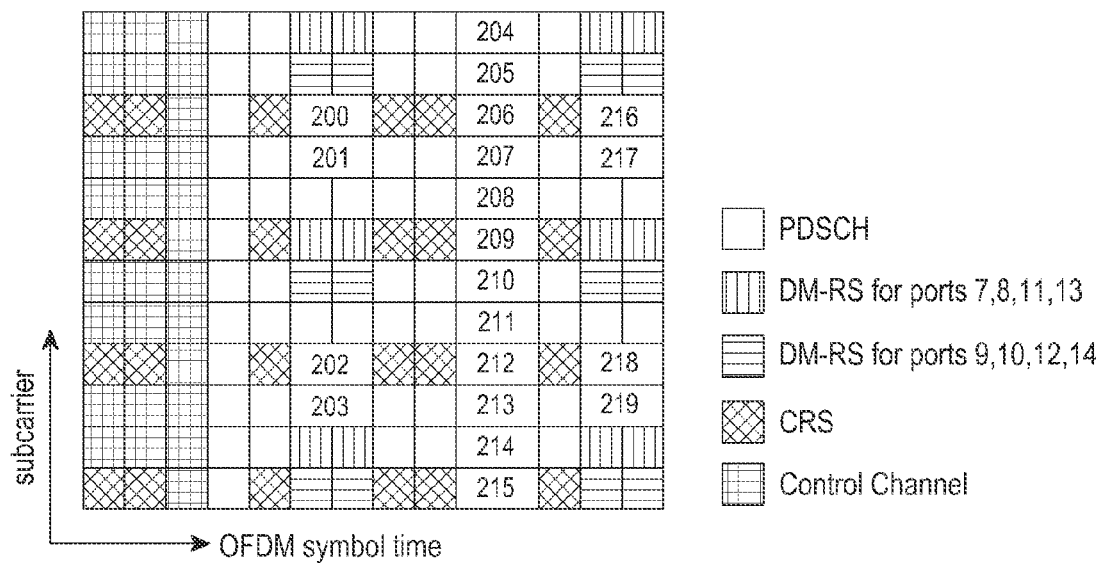
FIG. 3 schematically illustrates a location on which a CSI-RS is transmitted in a resource block in an LTE-A mobile communication system according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art that various changes and modifications of the exemplary embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary embodiment of the present invention is to provide an apparatus and method for transmitting/receiving reference signal transmission information in a cellular radio communication system. Other exemplary embodiments of the present invention provide an apparatus and method for transmitting/receiving reference signal transmission information in order to avoid timing collisions. Additional exemplary embodiments of the present invention provide an apparatus and method for receiving reference signals at timings which do not collide with other messages.

Exemplary embodiments of the present invention are described below with reference to a Long Term Evolution Advanced (LTE-A) mobile communication system based on an Orthogonal Frequency Division Multiplexing (OFDM) scheme. However, it will be understood by those of ordinary skill in the art that exemplary embodiments of the present invention may be applied to other mobile communication systems, including a High Speed Downlink Packet Access (HSDPA) mobile communication system, a High Speed Uplink Packet Access (HSUPA) mobile communication system, a Long-Term Evolution (LTE) mobile communication system, a High Rate Packet Data (HRPD) mobile communication system proposed in a 3rd Generation Project Partnership 2 (3GPP2), an Institute of Electrical and Electronics Engineers (IEEE) 802.16m mobile communication system, and the like.

For convenience, it will be assumed that the LTE-A mobile communication system provides a service to a UE using a Cooperative Multi-Point (CoMP) scheme, and the reference signal is a Channel Status Information Reference Signal (CSI-RS).

A cellular radio communication system is implemented by deploying a plurality of cell in a limited region. Each cell provides a radio communication service to UEs in a related cell through a Base Station (BS) providing the radio communication service. A particular UE only receives the radio communication service from a semi-statically selected cell. A scheme in which the radio communication service is provided through one BS is referred to as a non Cooperative multipoint (non-CoMP) scheme.

In a cellular radio communication system using the non-CoMP scheme, a high speed-data rate provided to each of all UEs in a cell extremely varies according to a location of each UE. A relatively high-data rate may be provided to a UE located at a cell center. However, it is difficult to provide a relatively high-data rate to a UE located at a cell boundary.

In the CoMP scheme, a plurality of cells provide a service to a UE located at a cell boundary by cooperating with one another. The cellular radio communication system using the CoMP scheme may provide an enhanced radio communication service compared with the cellular radio communication system using the non-CoMP scheme. For convenience, a cellular radio communication system using a CoMP scheme is referred to as 'cellular CoMP radio communication system', and a cellular radio communication system using a non-CoMP scheme is referred to as 'cellular non-CoMP radio communication system'.

Exemplary embodiments of the present invention propose a reference signal transmission information transmitting/receiving method in which a UE may effectively measure reference signals transmitted from a plurality of cells using a typical CoMP scheme such as a Dynamic cell Selection (DS) scheme, a Dynamic cell Selection with Dynamic Blanking (DS/DB) scheme, and a Joint Transmission (JT) scheme, and transmit feedback information including the measured result to a serving BS.

In the DS scheme, a UE measures channel status for each cell, the UE transmits feedback information indicating the measured channel status to a BS, the BS receiving the feedback information dynamically selects a cell which transmits downlink data targeting the UE, and the BS transmits data through the selected cell.

In the DS/DB scheme, a particular cell does not transmit data in order to decrease interference from the particular cell to other cell. In the JT scheme, a plurality of cells simultaneously transmit data to a particular UE.

In exemplary embodiments of the present invention, a UE may effectively measure channel status by designing a channel status measurement timing point of the UE in a cellular CoMP radio communication system in order that a CoMP scheme such as a DS scheme, a DS/DB scheme, and a JT scheme is effectively used in an LTE-A mobile communication system.

Figure 4:
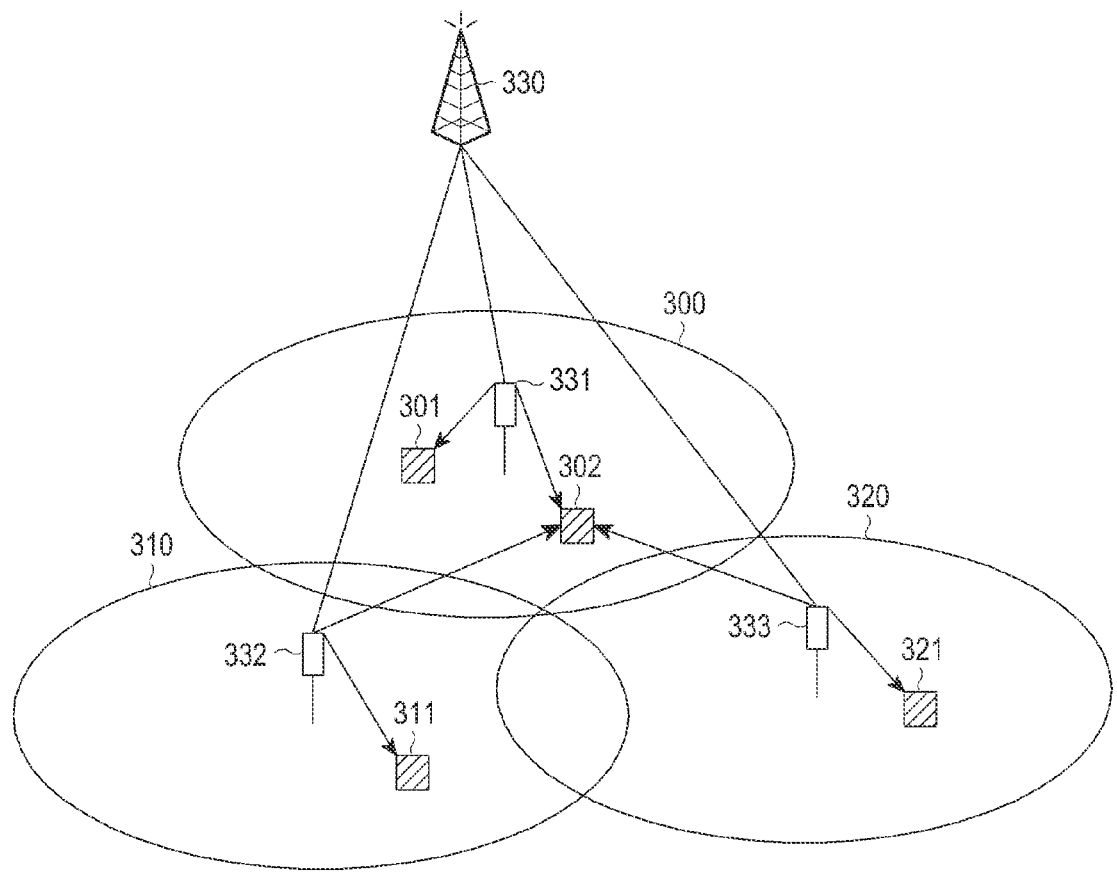
FIG. 4 schematically illustrates a structure of a cellular CoMP radio communication system according to an exemplary embodiment of the present invention.

FIG. 4 schematically illustrates a structure of a cellular CoMP radio communication system according to an exemplary embodiment of the present invention.

Referring to FIG. 4, the cellular CoMP radio communication system includes 3 cells, and each cell denotes a data transmission region to which a particular transmission point may provide a service. Each transmission point may be a Remote Radio Head (RRH) which commonly uses a cell identifier (Cell-ID) with a macro BS in a macro region, a macro cell, or a pico cell in which each transmission point uses a different Cell-ID.

In an exemplary embodiment of the present invention, a Central Control Apparatus (CCA) denotes an apparatus such as a BS or a Base Station Controller (BSC) which may transmit/receive data to/from a UE, and process the transmitted/received data. If each transmission point is a RRH which commonly uses a Cell-ID with a macro BS, the macro BS becomes the CCA. If each transmission point is a macro cell or a pico cell which uses a different cell-ID, an apparatus for integrating cells and managing the integrated cells becomes the CCA.

In FIG. 4, the cellular CoMP radio communication system includes 3 cells 300, 310, and 320, UEs 301, 311, and 321 which receive data from the closest cell, and a UE 302 which receive data from each of the cells 300, 310 and 320 using a CoMP scheme. Each of the UEs 301, 311, and 321 which receive the data from the closest cell estimates channel status for a cell at which each of the UEs 301, 311 and 321 is located using a reference signal, i.e., a CSI-RS, and transmits feedback information including the channel estimation result to a CCA 330. BSs 331, 332, and 333 manage the respective cells 300, 310 and 320, and each of the BSs 331, 332, and 333 may communicate with the CCA 330. The feedback information may be transmitted from a UE to the CCA 330 through each of the BSs 331, 332 and 333, or the CCA 330 may receive the feedback information from the UE.

In FIG. 4, the UE 302 receiving data transmitted from each of the cells 300, 310 and 320 using the CoMP scheme should estimate channel status for each cell using cell specific CSI-RSs transmitted from all of the cells 300, 310 and 320. So, the CCA 330 allocates 3 CSI-RS resources corresponding to each cell to the UE 302 for a channel estimation operation performed by the UE 302.

Figure 5:
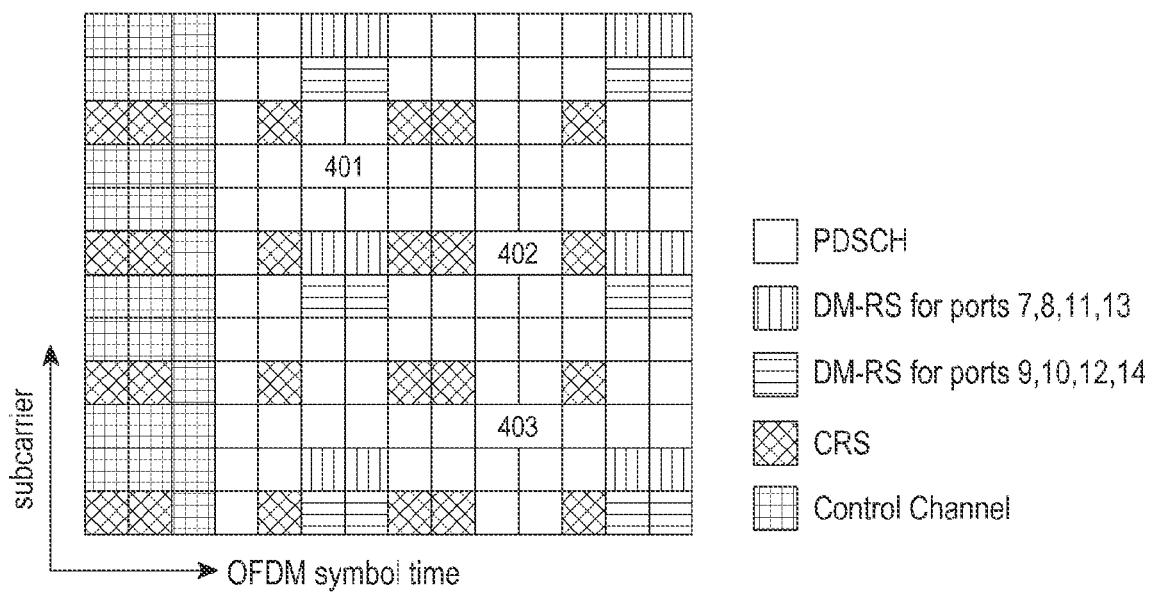
FIG. 5 schematically illustrates a location of a CSI-RS resource through which a CSI-RS is transmitted in a resource block in a cellular CoMP radio communication system according to an exemplary embodiment of the present invention.

FIG. 5 schematically illustrates a location of a CSI-RS resource through which a CSI-RS is transmitted in a resource block in a cellular CoMP radio communication system according to an embodiment of the present invention. Each block in FIG. 5 indicates a Resource Element (RE) included in a resource block.

Referring to FIG. 5, a CCA 330 allocates 3 CSI-RS resources 401, 402 and 403 and transmits a CSI-RS using the 3 CSI-RS resources 401, 402 and 403 in order that a UE 302 which receives a CSI-RS using a CoMP scheme may estimate a channel of each of the cells 300, 310, and 320 and estimate a channel through which control information and system information are transmitted. A CSI-RS resource through a CSI-RS used for estimating a channel of the cell 300 is transmitted may be an RE 401, a CSI-RS resource through a CSI-RS used for estimating a channel of the cell 310 is transmitted may be an RE 402, and a CSI-RS resource through a CSI-RS used for estimating a channel of the cell 320 is transmitted may be an RE 403.

A set including a resource through which a CSI-RS, used for a UE receiving data from a plurality of cells using a CoMP scheme to estimate channel status for each cell, is transmitted is called as a measurement set. The measurement set may include a resource, allocated to an arbitrary UE, through which the CSI-RS is transmitted. For convenience, a resource through which a CSI-RS is transmitted is referred to as a 'CSI-RS resource'. The measurement set includes at least one CSI-RS resource.

In FIG. 5, a CSI-RS resource for 3 cells is allocated in one resource block, and transmission timing information on a CSI-RS transmission sub-frame may be provided to the UE. ICSI-RS in Table 1 may be transmitted to CSI-RS resources 401, 402, and 403 for the 3 cells. For example, the UE may acquire a TCSI-RS and a ACSI-RS in table 1 as the transmission timing information upon receiving the ICSI-RS. Information on the number of transmission antennas which each CSI-RS resource uses should be transmitted to the UE. Further, transmission power used for each CSI-RS transmission and information on a Multimedia Broadcast multicast service Single Frequency Network (MBSFN) sub-frame for each cell should be transmitted to the UE.

If all CSI-RS resources included in a measurement set which is allocated to a UE receiving data from each cell using CoMP scheme are allocated by a RRH using a Cell-ID identical to the Cell-ID of the serving cell, the UE may determine a timing at which a CSI-RS is not transmitted for all CSI-RS resources allocated by cells using the CoMP scheme.

However, if at least one CSI-RS resource included in the measurement set is allocated by a cell using a Cell-ID different from the Cell-ID of the serving cell, it is difficult for the UE to determine a timing at which a CSI-RS is not transmitted for a CSI-RS resource allocated by the cell using the Cell-ID different from the Cell-ID of the serving cell using an LTE-A mobile communication system according to the related art.

In the LTE-A mobile communication system, even though a particular sub-frame is determined as a sub-frame through which a CSI-RS is transmitted, the CSI-RS is not transmitted through the particular sub-frame in the following 3 cases:

1. a sub-frame through which at least one of a synchronization signal, a PBCH signal, and an SIB1 message is transmitted;

2. a sub-frame through which a paging message is transmitted; and 3. a sub-frame through which an SIB2 message to an SIB13 message are transmitted.

For example, the synchronization signal is transmitted through a sub-frame mapping to a Sub-Frame Number (SFN) 0 and a sub-frame mapping to an SFN 5 included in each radio frame, and the PBCH signal is transmitted through a sub-frame mapping to an SFN 0.

A UE may determine a Cell-ID and a sub-frame number of a serving cell according to a synchronization signal of the cell which the UE currently accesses, for CSI-RS resources allocated by a cell which uses a Cell-ID identical to the Cell-ID of the cell which the UE currently accesses among CSI-RS resources included in the measurement set, so the UE may determine a transmission collision timing between a sub-frame through which one of a synchronization signal and a PBCH signal is transmitted and a sub-frame through which a CSI-RS is transmitted.

However, it is difficult for the UE to determine a transmission timing a synchronization signal or a PBCH signal of a cell which uses a Cell-ID different from the Cell-ID of the serving cell for a CSI-RS resource which is allocated by the cell which uses the Cell-ID different from the Cell-ID of the serving cell. Accordingly, it is difficult to determine a collision transmission timing between a sub-frame through which one of a synchronization signal and a PBCH signal is transmitted and a CSI-RS transmission timing for the CSI-RS resource which is allocated by the cell which uses the Cell-ID different from the Cell-ID of the serving cell.

The reason why it is difficult to detect the collision transmission timing between the sub-frame through which a synchronization signal and a PBCH signal is transmitted and the CSI-RS transmission timing for the CSI-RS resource which is allocated by the cell which uses the Cell-ID different from the Cell-ID of the serving cell is because each macro cell or each pico cell may use a different SFN in an LTE-A mobile communication system.

Accordingly, the BS should transmit synchronization signal transmission information and PBCH signal transmission information with each CSI-RS to the UE upon allocating the measurement set to the UE. For convenience, the synchronization signal transmission information and the PBCH signal transmission information are referred to as 'synchronization signal/PBCH signal transmission information'. The synchronization signal/PBCH signal transmission information includes an SFN offset δ, and the SFN offset δ denotes a different value between an SFN used in the serving cell and an SFN used in a cell which allocates each CSI-RS resource included in the measurement set. For example, the SFN offset δ may be any value between −4 and 5.

It will be assumed that measurement set information is {CSI-RS-1, CSI-RS-2}, and the BS transmits an SFN set {δ1=0, δ2=−2} with the measurement set information to the UE. The measurement set information includes an IDentifier (ID) of each CSI-RS resource included in the measurement set, and CSI-RS-n denotes an ID of the nth CSI-RS resource among REs included in an arbitrary resource block.

The SFN offset δ=0 indicates that the SFN of the serving cell is identical to an SFN of a cell which allocates a related CSI-RS resource, so the UE determines that an SFN of a cell which allocates CSI-RS-1 resource is identical to the SFN of the serving cell. The UE determines that an SFN of a cell which allocates CSI-RS-2 resource is a value generated by adding the SFN δ2=−2 to the SFN of the serving cell. If a sub-frame through a synchronization signal and a PBCH signal are transmitted collides with a CSI-RS transmission timing, the UE does not receive a CSI-RS through the transmission collision sub-frame.

In this case, if an SFN of the serving cell is x, the UE determines that an SFN of a cell which allocates a CSI-RS-2 resource is a value (x+δ2)mod 10. If the value (x+δ2)mod 10 is 0 or 5, the UE determines whether a resource through the synchronization signal and the PBCH signal are transmitted collides with the CSI-RS-2 resource, and if the resource through the synchronization signal and the PBCH signal are transmitted collides with the CSI-RS-2 resource, the UE does not receive CSI-RS at the collision sub-frame through the CSI-RS-2 resource.

An SIB1 message is transmitted through a sub-frame 5 included in a radio frame satisfying a criteria $n_f$ mod 2=0 starting from a radio frame satisfying a criteria $n_f$ mod 8=0, so the BS transmits a Radio Frame Number (RFN) as well as the SFN δ for each CSI-RS to the UE so that the UE may determine whether each CSI-RS resource collides with an SIB1 message resource. The SIB1 message resource denotes a resource through which the SIB1 message is transmitted.

In the LTE-A mobile communication system, cells may use different RFNs, respectively, so the UE should receive radio frame information related to a radio frame of a related cell in order to determine an SIB message transmission timing for a cell in which each CSI-RS is transmitted.

The radio frame information includes a RFN offset $\Delta_{nf}$. The BS may transmit the RFN offset $\Delta_{nf}$ as a difference value between a RFN $n_f$ of the serving cell and a RFN of cell in which each CSI-RS is transmitted to the UE so that the UE determines a RFN $n_{f,CSI-RS}$ of the cell in which each CSI-RS is transmitted. In this case, a RFN $n_{f,CSI-RS}$ of a cell in which a particular CSI-RS is transmitted may be calculated as Equation (2).

$$n_{f,CSI-RS} = n_f + \Delta_{nf} \quad (2)$$

The UE does not receive a CSI-RS if the SIB1 message resource is collided with a CSI-RS resource. The BS may transmit one of a Cell-ID of a cell which allocates each CSI-RS resource and bitmap information indicating that each CSI-RS is transmitted the serving cell or a neighbor cell with the measurement set information.

If the measurement set information is {CSI-RS-1, CSI-RS-2}, the BS may transmit one of a Cell-ID set {Cell-ID-1, Cell-ID-2} indicating Cell-IDs of cells which allocate a CSI-RS-1 resource and a CSI-RS-2 resource and bitmap information {1, 0} with the measurement set information to the UE so that the UE may determine whether a Cell-ID of a cell which allocates each CSI-RS resource is identical to a Cell-ID of the serving cell. If the {Cell-ID-1, Cell-ID-2} is transmitted, the UE may determine whether the Cell-ID of the cell which allocates each CSI-RS resource is identical to the Cell-ID of the serving cell by comparing the Cell-ID of the cell which allocates each CSI-RS resource with the Cell-ID of the serving cell.

If the bitmap information {1, 0} is transmitted, the UE determines that the Cell-ID of the cell which allocates each CSI-RS resource is identical to the Cell-ID of the serving cell for a value "1", and determines that the Cell-ID of the cell which allocates each CSI-RS resource is not identical to the Cell-ID of the serving cell for a value "0".

The UE may determine whether the Cell-ID of the cell which allocates each CSI-RS resource is identical to the Cell-ID of the serving cell using the bitmap information. The bitmap information {1, 0} indicates that the CSI-RS-1 resource is allocated by a cell which uses a Cell-ID identical to the Cell-ID of the serving cell and the CSI-RS-2 resource is allocated by a cell which uses a Cell-ID different from the Cell-ID of the serving cell.

The LTE-A mobile communication system may use at least one of the 2 schemes in which the UE determines whether the Cell-ID of the cell which allocates each CSI-RS resource is identical to the Cell-ID of the serving cell, the BS may transmit an SFN offset δ for only a CSI-RS resource allocated by the cell which uses the Cell-ID different from the Cell-ID of the serving cell. If the LTE-A mobile communication system does not use either of the 2 schemes, the BS may transmit an SFN offset δ for each CSI-RS resource included in the measurement set.

The paging message may be transmitted at a different sub-frame for each macro cell or each pico cell. In a Frequency Division Duplexing (FDD) mobile communication system, a sub-frame to be allocated for transmitting a paging message is determined according to 3 paging SFN set such as {9}, {4, 9}, {0, 4, 5, 9} within a radio frame by one of 6 periods, e.g., 10 [ms], 20 [ms], 40 [ms], 80 [ms], 160 [ms], and 320 [ms]. For convenience, a sub-frame through the paging message is transmitted is referred to as a 'paging sub-frame'. The paging SFN set denotes SFNs of paging sub-frames within a radio frame.

In a Time Division Duplexing (TDD) mobile communication system, a paging sub-frame is determined according to 3 paging SFN set such as {0}, {0, 5}, {0, 1, 5, 6}. The paging sub-frame is determined based on a paging association parameter included in an SIB2 message. The paging association parameter includes at least one of a default paging cycle (defaultPagingCycle) and paging additional information (nB). The UE may detect paging sub-frame information of a serving cell, and may not detect paging sub-frame information of other cell different from the serving cell.

If a measurement set including a plurality of CSI-RS resources is allocated to the UE, a timing at which a CSI-RS transmission timing collides with a paging sub-frame may be changed according to a cell which allocates a related CSI-RS resource. One scheme in which the UE determines the timing at which the CSI-RS transmission timing collides with the paging sub-frame, and does not receive a CSI-RS at the collision timing, is a scheme in which the BS transmits a paging association parameter (e.g., defaultPagingCycle, nB, etc)

with a RFN offset $\Delta_{nf}$ and SFN offset δ0 of a cell which allocates each CSI-RS resource included in a measurement set for each CSI-RS resource, and the UE calculates a collision timing at which each CSI-RS transmission timing collides with a paging sub-frame itself, and does not receive a CSI-RS at a calculated collision timing.

In this case, an RFN offset $\Delta_{nf}$, an SFN offset δ, a defaultPagingCycle, and nB for each cell which allocates all CSI-RS resources may be transmitted to the UE, or a RFN offset $\Delta_{nf}$, an SFN offset δ, a defaultPagingCycle, and nB for a cell which uses a Cell-ID different from a Cell-ID of other cell may be transmitted to the UE.

Whether the BS transmits, to the UE, an RFN offset $\Delta_{nf}$, an SFN offset δ, a defaultPagingCycle and nB for all CSI-RS resources or a CSI-RS resource allocated by a cell using a Cell-ID different from the Cell-ID of the serving cell depends on whether the UE may determine that a Cell-ID of a cell which allocates a related CSI-RS resource is identical to the Cell-ID of the serving cell.

The BS may transmit a RFN offset $\Delta_{nf}$, defaultPagingCycle and nB to the UE without transmitting the SFN offset δ to the UE. This case is a case in which the UE may calculate the SFN offset δ itself by detecting a synchronization signal of other cell.

Figure 6:
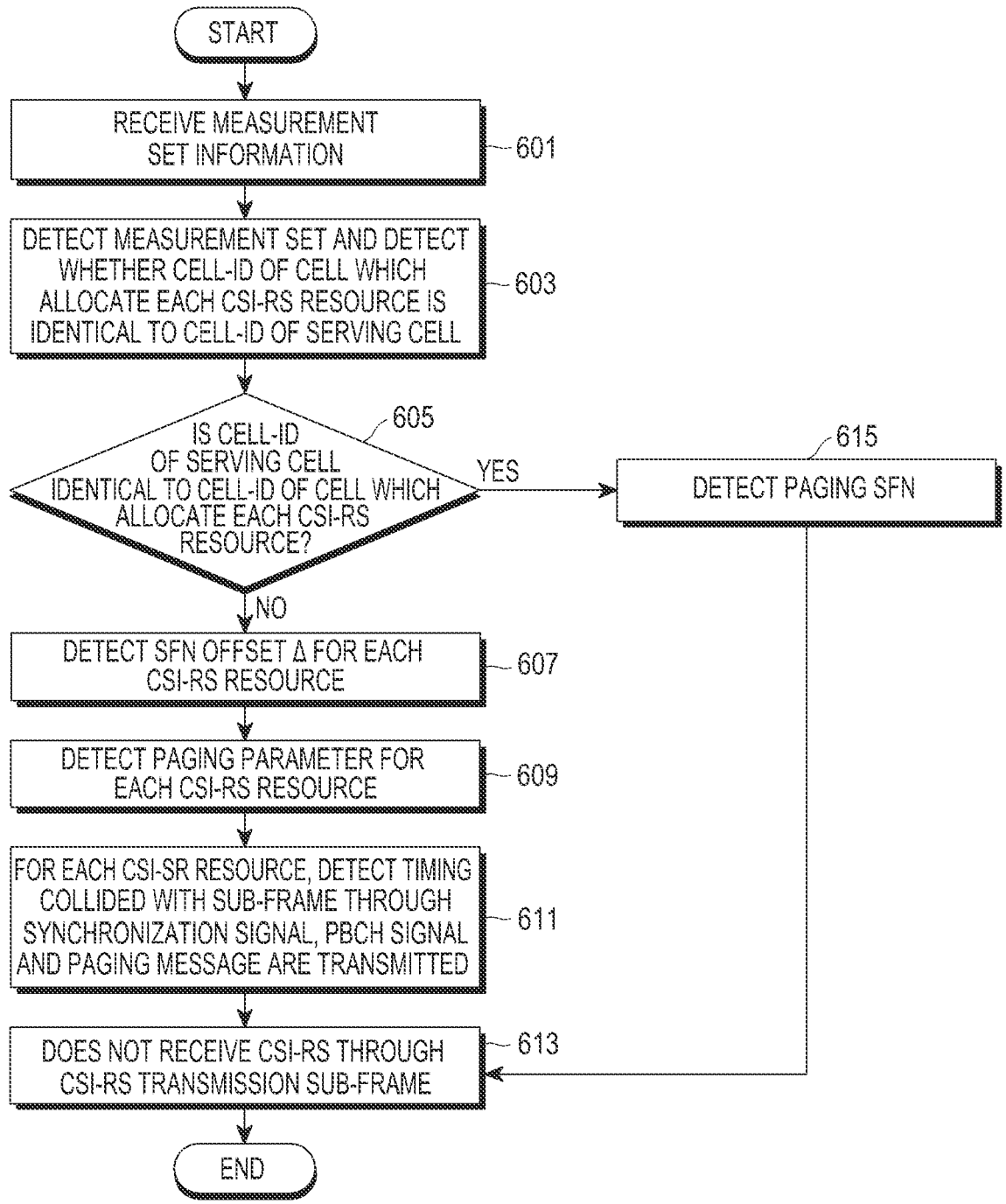
FIG. 6 is a flowchart illustrating a method for receiving a CSI-RS in a UE in a cellular CoMP radio communication system according to a first exemplary embodiment of the present invention.

FIG. 6 is a flowchart illustrating a method for receiving a CSI-RS in a UE in a cellular CoMP radio communication system according to a first exemplary embodiment of the present invention.

Referring to FIG. 6, the flowchart indicates a CSI-RS reception operation performed in a UE if a BS transmits measurement set information, information indicating whether a Cell-ID of a cell which allocates each CSI-RS resource is identical to a Cell-ID of a serving cell, and a paging parameter such as a defaultPagingCycle and nB is transmitted to the UE. For convenience, the information indicating whether the Cell-ID of the cell which allocates each CSI-RS resource is identical to the Cell-ID of the serving cell is referred to as 'Cell-ID match information'. The BS may transmit an SFN offset δ with the paging parameter to the UE, or the UE may calculate the SFN offset δ itself according to a synchronization signal of a neighbor cell.

The UE receives measurement set information from the BS in step 601. The UE determines a measurement set based on the measurement set information and determines whether the Cell-ID of the cell which allocates each CSI-RS resource is identical to the Cell-ID of the serving cell in step 603.

The UE may determine whether the Cell-ID of the cell which allocates each CSI-RS resource is identical to the Cell-ID of the serving cell by comparing a Cell-ID transmitted with a CSI-RS with Cell-ID of the serving cell or by receiving bitmap information indicating the Cell-ID match information from the BS.

The UE determines whether the Cell-ID of the serving cell is identical to the Cell-ID of the cell which allocates each CSI-RS resource in step 605. If the Cell-ID of the serving cell is not identical to the Cell-ID of the cell which allocates each CSI-RS resource, the UE determines an SFN offset δ for each CSI-RS resource in step 607. The BS may transmit the SFN offset δ with the measurement set information to the UE, or the UE may calculate the SFN offset δ itself according to a synchronization signal of a neighbor cell.

The UE determines a paging parameter for each CSI-RS resource received from the BS in step 609. For each CSI-SR resource, the UE determines a timing collided with a sub-frame through a synchronization signal, a PBCH signal and a paging message are transmitted using a RFN offset $\Delta n_f$ and an SFN offset δ in step 611. If a CSI-RS transmission sub-frame collides with a sub-frame through a synchronization signal, PBCH signal, and a paging message, the UE does not receive a CSI-RS through the CSI-RS transmission sub-frame in step 613.

Accordingly, the UE may selectively receive a CSI-RS according to whether a CSI-RS transmission frame collides with a sub-frame through which the synchronization signal, the PBCH signal, and the paging message are transmitted.

If the Cell-ID of the serving cell is identical to the Cell-ID of the cell which allocates each CSI-RS resource, i.e., a related CSI-RS is transmitted from the serving cell, the UE determines paging SFN by detecting system information of the serving cell, e.g., an SIB2 message in step 615 and proceeds to step 613.

Unlike the method shown in FIG. 6, it will be understood by those of ordinary skill in the art that the UE may perform a related operation in step 607 after performing a related operation in step 601 without performing related operations in steps 603, 605, and 615.

The second scheme in which the UE may determine a CSI-RS transmission timing collided with a paging sub-frame and may not receive a related CSI-RS at a collision timing is a scheme in which a BS transmits a RFN offset Δnf, an SFN offset δ, paging cycle information, and bits indicating one of 3 paging SFN sets selectable as a paging sub-frame to the UE, and the UE does not receive a CSI-RS at a collision timing Here, 3 bits are needed for the BS to inform the UE of one of 6 paging cycles usable in the LTE-A mobile communication system, i.e., 10 [ms], 20 [ms], 40 [ms], 80 [ms], 160 [ms], 320 [ms], and 4 bits are needed for the BS to inform the UE of one of 10 SFN offsets.

Further, 2 bits are needed for the BS to inform the UE of one of 3 paging SFN sets (an FDD mobile communication system supports 3 paging SFN sets {9}, {4, 9}, {0, 4, 5, 9}, and 7 bits are needed for the BS to inform the UE of one of 120 combinations of the SFN offset δ, the paging cycle, and the paging SFN set.

Examples of a codeword indicating an SFN offset δ and a paging SFN set are expressed in Table 4. As expressed in Table 4, a UE does not receive a CSI-RS through sub-frames mapping to sub-frame numbers (4−2=2) and (9−2=7) upon receiving a particular CSI-RS and a codeword 00111.

TABLE 4

| codeword | δ | paging SFN set |
|----------|-----|----------------|
| 00000 | −4 | {9} |
| 00001 | −4 | {4, 9} |
| 00010 | −4 | {0, 4, 5, 9} |
| 00011 | −3 | {9} |
| 00100 | −3 | {4, 9} |
| 00101 | −3 | {0, 4, 5, 9} |
| 00110 | −2 | {9} |
| 00111 | −2 | {4, 9} |
| 01000 | −2 | {0, 4, 5, 9} |
| 01001 | −1 | {9} |
| 01010 | −1 | {4, 9} |
| 01011 | −1 | {0, 4, 5, 9} |
| 01100 | 0 | {9} |
| 01101 | 0 | {4, 9} |
| 01110 | 0 | {0, 4, 5, 9} |
| 01111 | 1 | {9} |
| 10000 | 1 | {4, 9} |
| 10001 | 1 | {0, 4, 5, 9} |
| 10010 | 2 | {9} |
| 10011 | 2 | {4, 9} |
| 10100 | 2 | {0, 4, 5, 9} |
| 10101 | 3 | {9} |
| 10110 | 3 | {4, 9} |

TABLE 4-continued

| codeword | δ | paging SFN set |
|---|---|---|
| 10111 | 3 | {0, 4, 5, 9} |
| 11000 | 4 | {9} |
| 11001 | 4 | {4, 9} |
| 11010 | 4 | {0, 4, 5, 9} |
| 11011 | 5 | {9} |
| 11100 | 5 | {4, 9} |
| 11101 | 5 | {0, 4, 5, 9} |
| 11110 | reserved | Reserved |
| 11111 | reserved | Reserved |

In the second scheme in which the UE may determine a CSI-RS transmission timing collided with a paging sub-frame, the BS may not transmit an SFN offset δ and may only transmit 3 bits indicating a RFN offset $\Delta n_f$ and a paging cycle and 2 bits indicating a paging SFN set.

This case is a case in which the UE may calculate the SFN offset δ by detecting a synchronization signal of other cell.

The BS may transmit 2 bits indicating the SFN offset δ and the paging SFN set with all CSI-RSs or a CSI-RS transmitted by a cell using a Cell-ID different from a Cell-ID of a serving cell to the UE. The BS may transmit the 2 bits indicating the SFN offset δ and the paging SFN set with all the CSI-RSs or the CSI-RS transmitted by the cell using the Cell-ID different from the Cell-ID of the serving cell to the UE according whether the BS detects a Cell-ID match information.

Figure 7:
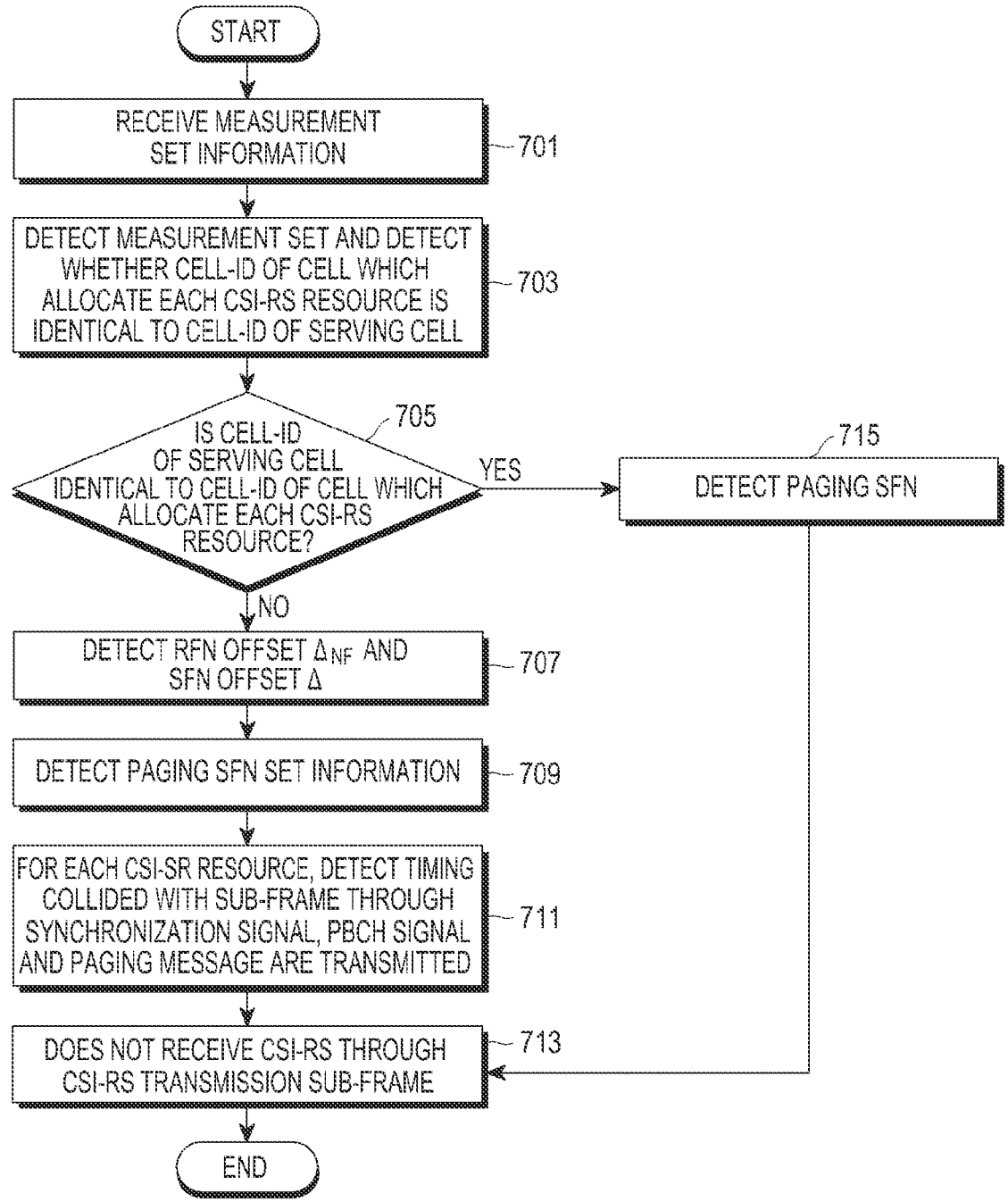
FIG. 7 is a flowchart illustrating a method for receiving a CSI-RS in a UE in a cellular CoMP radio communication system according to a second exemplary embodiment of the present invention.

FIG. 7 is a flowchart illustrating a method for receiving a CSI-RS in a UE in a cellular CoMP radio communication system according to a second exemplary embodiment of the present invention.

Referring to FIG. 7, the flowchart indicates a CSI-RS reception operation performed in a UE if a BS transmits measurement set information and 2 bits indicating Cell-ID match information and a paging SFN set for each CSI-RS to the UE. The BS may transmit an SFN offset δ with the 2 bits indicating the paging SFN set to the UE, or the UE may calculate the SFN offset δ itself according to a synchronization signal of a neighbor cell.

The UE receives measurement set information from the BS in step 701. The UE determines a measurement set based on the measurement set information and determines whether the Cell-ID of the cell which allocates each CSI-RS resource is identical to the Cell-ID of the serving cell in step 703. The UE may determine whether the Cell-ID of the cell which allocates each CSI-RS resource is identical to the Cell-ID of the serving cell by comparing a Cell-ID transmitted with a CSI-RS with Cell-ID of the serving cell or by receiving bitmap information indicating the Cell-ID match information from the BS.

The UE determines whether the Cell-ID of the serving cell is identical to the Cell-ID of the cell which allocates each CSI-RS resource in step 705. If the Cell-ID of the serving cell is not identical to the Cell-ID of the cell which allocates each CSI-RS resource, the UE determines a RFN offset $\Delta n_f$ and an SFN offset δ for each CSI-RS resource in step 707. The BS may transmit the SFN offset δ with the measurement set information or the SFN offset δ in a form of a codeword in Table 4, and the UE may calculate the SFN offset δ itself according to a synchronization signal of a neighbor cell.

The UE determines paging SFN set information, i.e., 2 bits indicating a paging SFN set which the BS transmits to the UE in step 709. The 2 bits indicating a paging SFN set may be independently transmitted with the SFN offset δ, or may be transmitted in a form of a codeword in Table 4.

For each CSI-SR resource, the UE determines a timing collided with a sub-frame through a synchronization signal, a PBCH signal and a paging message are transmitted using a RFN offset $\Delta n_f$ and an SFN offset δ in step 711. If a CSI-RS transmission sub-frame collides with a sub-frame through a synchronization signal, PBCH signal and a paging message, the UE does not receive a CSI-RS through the CSI-RS transmission sub-frame in step 713. The UE may determine the paging sub-frame using the measurement set information and the 2 bits transmitted with each CSI-RS in step 709.

If a CSI-RS transmission sub-frame collides with a sub-frame through a synchronization signal, PBCH signal, and a paging message, the UE does not receive a CSI-RS through the CSI-RS transmission sub-frame in step 713. Accordingly, the UE may selectively receive a CSI-RS according to whether a CSI-RS transmission frame collides with a sub-frame through which the synchronization signal, the PBCH signal, and the paging message are transmitted.

If the Cell-ID of the serving cell is identical to the Cell-ID of the cell which allocates each CSI-RS resource, i.e., a related CSI-RS is transmitted from the serving cell, the UE determines a paging SFN by determining system information of the serving cell, e.g., an SIB2 message in step 715 and proceeds to step 713.

Unlike the method of FIG. 7, it will be understood by those of ordinary skill in the art that the UE may perform a related operation in step 707 after performing a related operation in step 701 without performing related operations in steps 703, 705, and 715.

The third scheme in which the UE may determine a CSI-RS transmission timing collided with a paging sub-frame and may not receive a related CSI-RS at a collision timing is a scheme in which the UE receives a RFN offset Δnf, an SFN offset δ, and paging cycle information with each CSI-RS from the BS, and does not receive a CSI-RS through sub-frames mapping to preset locations, i.e., sub-frames corresponding to a paging SFN set {0+δ, 4+δ, 5+δ, 9+δ}(in an FDD mobile communication system) or sub-frames corresponding to a paging SFN set {0+δ, 1+δ, 5+δ, 6+δ}(in a TDD mobile communication system) in a radio frame mapping to a preset paging cycle for a related CSI-RS.

If the UE is able to determine whether a Cell-ID of each cell which allocates each CSI-RS resource is identical to a Cell-ID of a serving cell, the UE determines a paging sub-frame based on system information of the serving cell, e.g., an SIB2 message if the Cell-ID of each cell which allocates each CSI-RS resource is identical to the Cell-ID of the serving cell, and does not receive a CSI-RS through sub-frames mapping to all paging SFN sets {0+δ, 4+δ, 5+δ, 9+δ} and {0+δ, 1+δ, 5+δ, 6+δ} in a radio frame according to a preset period if the Cell-ID of each cell which allocates each CSI-RS resource is not identical to the Cell-ID of the serving cell.

If the UE is unable to determine whether the Cell-ID of each cell which allocates each CSI-RS resource is identical to the Cell-ID of the serving cell, for all CSI-RS resources included in the measurement set, the UE does not receive a CSI-RS through sub-frames mapping to all paging SFN sets {0+δ, 4+δ, 5+δ, 9+δ} and {0+δ, 1+δ, 5+δ, 6+δ} in a radio frame according to a preset period.

Figure 8:
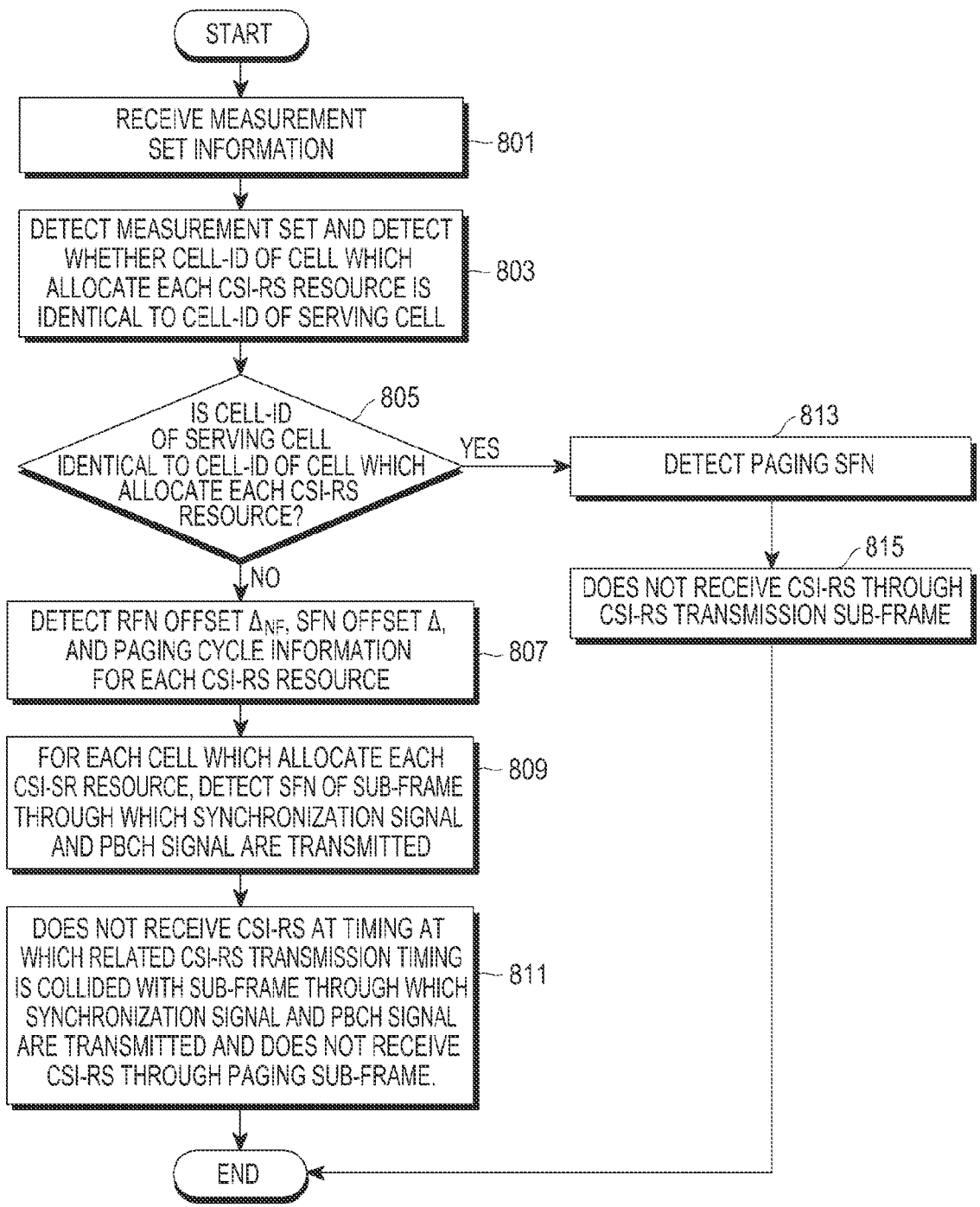
FIG. 8 is a flowchart illustrating a method for receiving a CSI-RS in a UE in a cellular CoMP radio communication system according to a third exemplary embodiment of the present invention.

FIG. 8 is a flowchart illustrating a method for receiving a CSI-RS in a UE in a cellular CoMP radio communication system according to a third exemplary embodiment of the present invention.

Referring to FIG. 8, the flowchart indicates a CSI-RS reception operation performed in a UE if a BS transmits measurement set information, Cell-ID match information, a RFN offset $\Delta_{nf}$, an SFN offset, and paging cycle information for each CSI-RS to the UE. In this case, the BS may transmit a SFN offset δ with the measurement set information to the UE, or the UE may calculate the SFN offset δ itself according to a synchronization signal of a neighbor cell and a comparison of a Cell-ID of a serving cell and a Cell-ID of the neighbor cell.

The UE receives measurement set information from the BS in step 801. The UE determines a measurement set based on the measurement set information and determines whether the Cell-ID of the cell which allocates each CSI-RS resource is identical to the Cell-ID of the serving cell in step 803. The UE may determine whether the Cell-ID of the cell which allocates each CSI-RS resource is identical to the Cell-ID of the serving cell by comparing a Cell-ID transmitted with a CSI-RS with Cell-ID of the serving cell or by receiving bitmap information indicating Cell-ID match information from the BS.

The UE determines whether the Cell-ID of the serving cell is identical to the Cell-ID of the cell which allocates each CSI-RS resource in step 805. If the Cell-ID of the serving cell is not identical to the Cell-ID of the cell which allocates each CSI-RS resource, the UE determines a RFN offset $\Delta_{nf}$, an SFN offset δ, and paging cycle information for each CSI-RS resource in step 807. The BS may transmit the SFN offset δ with the measurement set information, and the UE may calculate the SFN offset δ itself according to a synchronization signal of a neighbor cell.

For each cell which allocates each CSI-SR resource, the UE determines an SFN of sub-frame through which a synchronization signal and a PBCH signal are transmitted using the SFN offset δ in step 809. The UE does not receive a CSI-RS at a timing at which a related CSI-RS transmission timing collides with a sub-frame through which a synchronization signal and a PBCH signal are transmitted and does not receive the CSI-RS through paging sub-frames, i.e., paging sub-frames set according to a paging cycle (for example, paging sub-frames according to a paging SFN set {0+δ, 4+δ, 5+δ, 9+δ} in an FDD mobile communication system, and paging sub-frames according to a paging SFN set {0+δ, 1+δ, 5+δ, 6+δ}) in step 811.

If the Cell-ID of the serving cell is identical to the Cell-ID of the cell which allocates each CSI-RS resource, i.e., a related CSI-RS is transmitted from the serving cell, the UE determines a paging SFN by detecting system information of the serving cell, e.g., an SIB2 message in step 813. If a CSI-RS transmission sub-frame collides with a sub-frame through which a synchronization signal, a PBCH signal and a paging message are transmitted, the UE does not receive a CSI-RS through the CSI-RS transmission sub-frame in step 815.

Unlike the method of FIG. 8, it will be understood by those of ordinary skill in the art that the UE may perform a related operation in step 807 after performing a related operation in step 801 without performing related operations in steps 803, 805, and 813.

As described above, a sub-frame through system information such as an SIB2 message to an SIB13 message is dynamically scheduled within a particular window set using a period determine by the BS. For example, a size of a window used for transmitting the system information may be determined based on a system information window length (si-WindowLength) parameter, and a transmission period for each of the SIB2 message to the SIB13 message may be determined based on a system information period (si-Periodicity) parameter for each SIB message set.

One scheme in which the UE determines a timing at which each CSI-RS transmission timing collide with a sub-frame through system information is transmitted, and does not receive a related CSI-RS at the collision timing, is a scheme in which, for each CSI-RS, the BS transmits an si-WindowLength parameter and an si-Periodicity parameter set for each SIB message set to the UE, and the UE does not receive a related CSI-RS through all sub-frames included in a related window corresponding to a related paging cycle. For example, it will be assumed that system information of a cell which allocates a particular CSI-RS resource among CSI-RS resources included in a measurement set allocated to the UE uses a paging cycle setting described in Table 3.

The BS transmits a CSI-RS transmitted through the particular CSI-RS resource, an si-WindowLength parameter and an si-Periodicity parameter set {80 ms, 160 ms, 320 ms} to the UE in order to transmit information on a system information transmission timing to the UE. The UE does not receive a CSI-RS within a window set based on the si-WindowLength parameter by a related paging cycle. In this case, the BS should transmit a RFN $n_f$ for a cell which uses a Cell-ID different from a Cell-ID of a serving cell with a related CSI-RS. In the LTE-A mobile communication system, each cell may use a different RFN $n_f$, so the UE should receive information on RFN $n_f$ in order to determine a transmission timing for system information.

The second scheme in which the UE determines a timing at which each CSI-RS transmission timing collides with a sub-frame through system information is transmitted, and does not receive a related CSI-RS at the collision timing, is a scheme in which, for each CSI-RS, the BS transmits an si-WindowLength parameter and an si-Periodicity parameter set for each SIB message set to the UE, and the UE does not receive a related CSI-RS within a set window on if the si-WindowLength parameter is less than a particular value Y.

In this scheme, if the si-WindowLength parameter is less than Y, a degree of freedom for a timing at which system information may be transmitted is relatively low such that the UE does not receive a CSI-RS within a relative window. On the other hand, if the si-WindowLength parameter is equal to or greater than Y, the degree of freedom for the timing at which the system information may be transmitted is relatively high and the BS may transmit the system information at a timing which does not collide with a CSI-RS transmission timing such that the UE may receive a CSI-RS within a relative window. Y may be one of {2 ms, 5 ms, 10 ms, 15 ms, 20 ms, 40 ms}, or an arbitrary value determined by the BS. If Y is the arbitrary value determined by the BS, the BS may transmit Y to the UE using a Radio Resource Control (RRC) message.

If the UE is able to determine whether a Cell-ID of each cell which allocates each CSI-RS resource is identical to a Cell-ID of a serving cell, the UE determines a system information transmission timing based on an SIB1 message of the serving cell if the Cell-ID of each cell which allocates each CSI-RS resource is identical to the Cell-ID of the serving cell. The UE determines the system information transmission timing and a CSI-RS transmission timing using the described scheme according to the si-WindowLength parameter and the si-Periodicity parameter transmitted with each CSI-RS.

However, if the UE is unable to determine whether the Cell-ID of each cell which allocates each CSI-RS resource is identical to the Cell-ID of the serving cell, for all CSI-RS resources included in the measurement set, the UE determines a timing at which a system information transmission collides with a CSI-RS transmission using the described scheme according to the si-WindowLength parameter and the si-Periodicity parameter transmitted with each CSI-RS, and does not receive a CSI-RS at the collision timing.

As described above, in the CSI-RS reception methods, the UE does not receive a CSI-RS at a CSI-RS transmission timing which collides with a sub-frame through which a synchronization signal, a PBCH signal and a paging message are transmitted or a sub-frame through which system information is transmitted.

However, in according to an exemplary embodiment of the present invention, the UE receives information on a sub-frame through which the UE does not receive a CSI-RS regardless of a type of a signal which collides with a CSI-RS transmission through each CSI-RS resource included in a measurement set. For convenience, the information in the sub-frame through which the UE does not receive a CSI-RS is referred to as 'CSI-RS reception prevention sub-frame information'.

Figure 9:
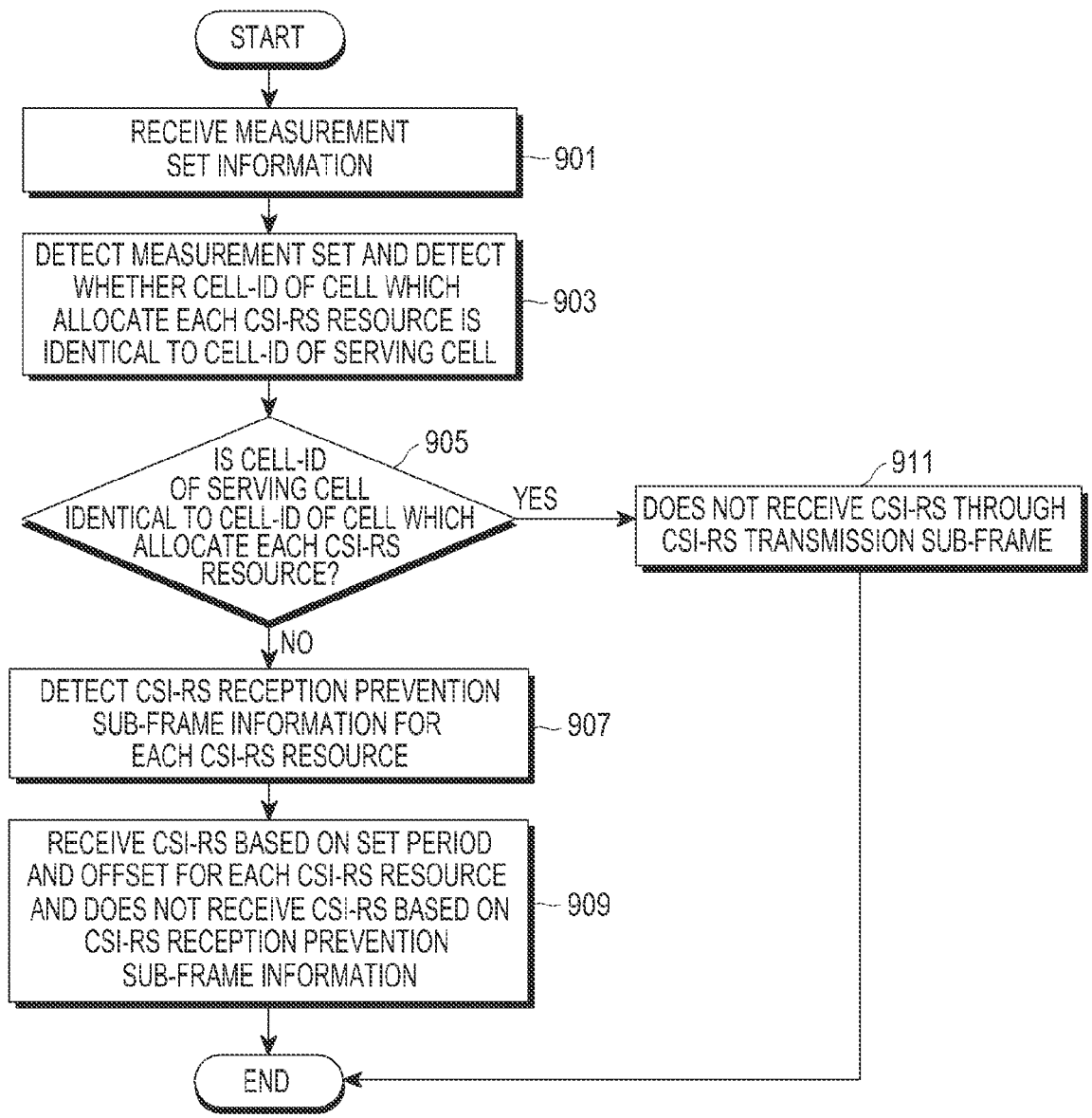
FIG. 9 is a flowchart illustrating a method for receiving a CSI-RS in a UE in a cellular CoMP radio communication system according to a fourth exemplary embodiment of the present invention.

FIG. 9 is a flowchart illustrating a method for receiving a CSI-RS in a UE in a cellular CoMP radio communication system according to a fourth exemplary embodiment of the present invention.

Referring to FIG. 9, the flowchart indicates a CSI-RS reception operation performed in a UE if a BS transmits measurement set information, Cell-ID match information, and CSI-RS reception prevention sub-frame information the UE.

The UE receives measurement set information from the BS in step 901. The UE determines a measurement set based on the measurement set information and determines whether the Cell-ID of the cell which allocates each CSI-RS resource is identical to the Cell-ID of the serving cell in step 903. The UE may determine whether the Cell-ID of the cell which allocates each CSI-RS resource is identical to the Cell-ID of the serving cell by comparing a Cell-ID transmitted with a CSI-RS with Cell-ID of the serving cell or by receiving bitmap information indicating Cell-ID match information from the BS.

The UE determines whether the Cell-ID of the serving cell is identical to the Cell-ID of the cell which allocates each CSI-RS resource in step 905. If the Cell-ID of the serving cell is not identical to the Cell-ID of the cell which allocates each CSI-RS resource, the UE determines CSI-RS reception prevention sub-frame information for each CSI-RS resource in step 907.

The format of the CSI-RS reception prevention sub-frame information may be one of an offset format and a bitmap format. If the measurement set information is {CSI-RS-1, CSI-RS-2}, and a period and an offset is used, an example of the CSI-RS reception prevention sub-frame information is expressed in Table 5.

TABLE 5

| CSI-RS-1 | | CSI-RS-2 | |
|---|---|---|---|
| Period | Offset | Period | Offset |
| 10 ms | 0, 4, 5 | 10 ms | 1, 2, 6, 7 |
| 80 ms | 3, 7, 9 | 80 ms | 5 |
| 120 ms | 3, 7, 9 | | |

If the UE receives the CSI-RS reception prevention sub-frame information in Table 5 with the measurement set information, for a CSI-RS-1 resource, the UE does not receive CSI-RS through sub-frames 0, 4, and 5 by 10 [ms], and sub-frames 3, 7, and 9 by 80 [ms] and 120 [ms], and, for a CSI-RS-2 resource, the UE does not receive CSI-RS through sub-frames 1, 2, 6 and 7 by 10 [ms], and a sub-frame 5 by 80 [ms].

If the format of the CSI-RS reception prevention sub-frame information is the bitmap format, each bit included in the bitmap indicating the CSI-RS reception prevention sub-frame information denotes a sub-frame through which the UE will receive a CSI-RS. For example, the UE receives a CSI-RS through a sub-frame related to a bit with a bit value "1", and does not receive a CSI-RS through a sub-frame related to a bit with a bit value "0". If a bitmap {[1, 1, 0, 1], [1, 1, 0, 0]} with measurement set information {CSI-RS-1, CSI-RS-2} are transmitted, the UE does not receive a CSI-RS at the third CSI-RS transmission timing among 4 CSI-RS transmission timings for a CSI-RS-1 resource, and does not receive a CSI-RS at the third and fourth CSI-RS transmission timings among the 4 CSI-RS transmission timings for a CSI-RS-2 resource.

The CSI-RS reception prevention sub-frame information with different values may be allocated to each UE, so the BS may transmit information on which CSI-RS reception prevention sub-frame information is applied to which CSI-RS resource among CSI-RS resources included in a measurement set upon allocating the measurement set.

If the format of the CSI-RS reception prevention sub-frame information is the bitmap format, the first CSI-RS reception prevention sub-frame information is [1, 1, 0, 1], the second CSI-RS reception prevention sub-frame information is [1, 1, 0, 0], and the measurement set information is {CSI-RS-1, CSI-RS-2, CSI-RS-3}, the BS should allocate one of the first CSI-RS reception prevention sub-frame information and the second CSI-RS reception prevention sub-frame information for each CSI-RS resource included in the measurement set in order to determine a CSI-RS reception timing for each CSI-RS resource.

A scheme in which the BS transmits the CSI-RS reception prevention sub-frame information is a scheme in which the BS transmits a CSI-RS reception prevention sub-frame index to the UE for each CSI-RS resource included in the measurement set, or a scheme in which the BS transmits a Cell-ID of a cell which allocates a related CSI-RS resource with each CSI-RS, and a Cell-ID of a cell which uses the CSI-RS reception prevention sub-frame information with the CSI-RS reception prevention sub-frame information such that the UE determines CSI-RS reception prevention sub-frame information of a cell which uses a Cell-ID identical to the Cell-ID of the serving cell as the UE's CSI-RS reception prevention sub-frame information for each CSI-RS resource.

The BS need not transmit CSI-RS reception prevention sub-frame information of the serving cell to the UE. In this case, if a Cell-ID transmitted with a CSI-RS is identical to a Cell-ID of the serving cell, the UE may not receive a CSI-RS based on the CSI-RS reception prevention sub-frame information of the serving cell.

The UE may regard a CSI-RS resource to which CSI-RS reception prevention sub-frame information is not allocated as a CSI-RS resource allocated by the serving cell, and set the CSI-RS reception prevention sub-frame information of the serving cell as CSI-RS reception prevention sub-frame information for a related CSI-RS resource for a CSI-RS resource to which CSI-RS reception prevention sub-frame information is not allocated among CSI-RS resources included in the measurement set.

The UE determines CSI-RS reception prevention sub-frame information for each CSI-RS resource in step 907. The UE receives a CSI-RS based on a set period and an offset for each CSI-RS resource and does not receive a CSI-RS based on the CSI-RS reception prevention sub-frame information in step 909.

If the Cell-ID of the serving cell is identical to the Cell-ID of the cell which allocates each CSI-RS resource, i.e., a related CSI-RS is transmitted from the serving cell, the UE does not receive a CSI-RS through a CSI-RS transmission sub-frame if the CSI-RS transmission sub-frame collides with a sub-frame through which a synchronization signal, a PBCH signal, a paging message, and system information are transmitted in step 911.

Unlike the method shown in FIG. 9, it will be understood by those of ordinary skill in the art that the UE may perform a related operation in step 907 after performing a related operation in step 901 without performing related operations in steps 903, 905, and 911.

Figure 10:
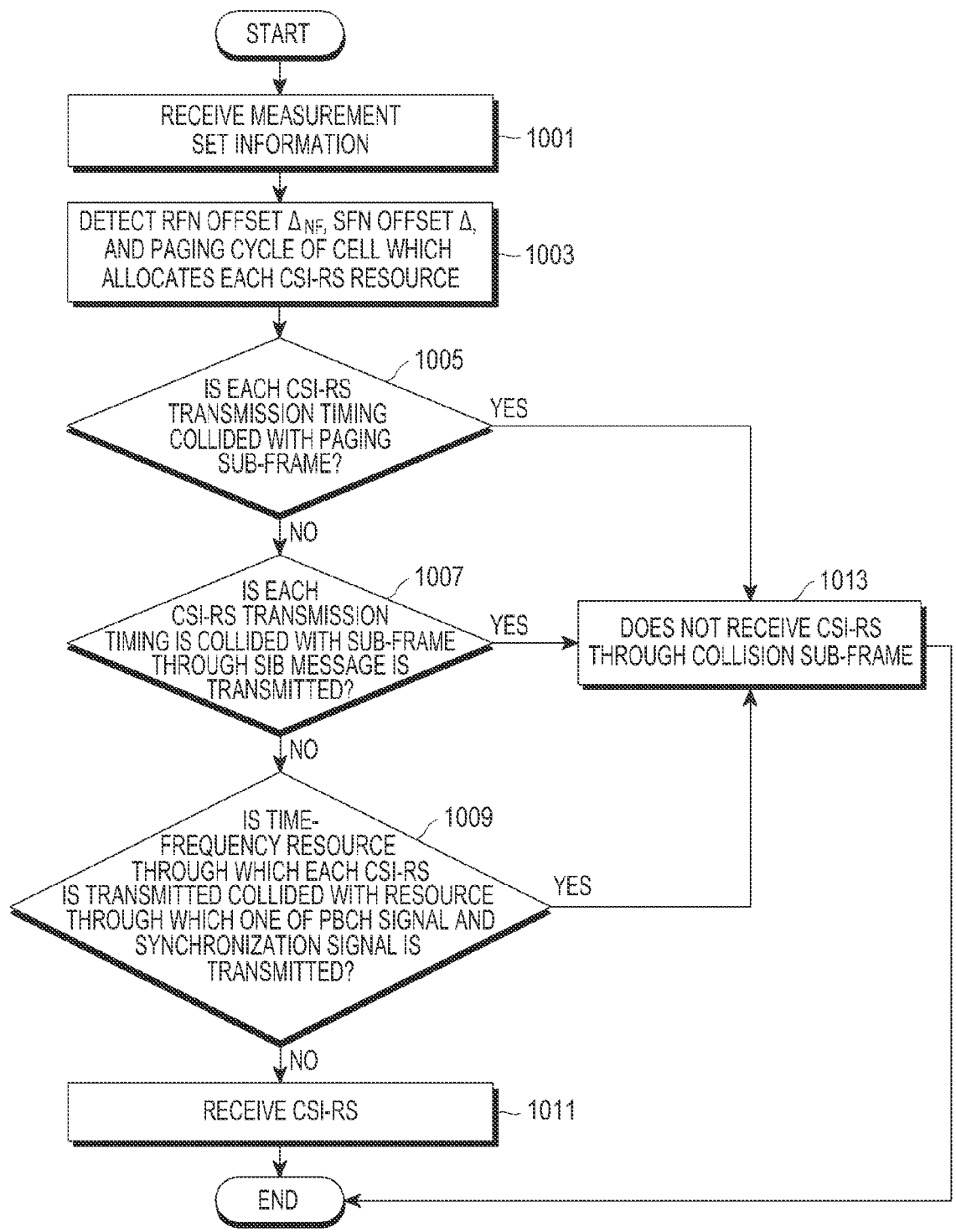
FIG. 10 is a flowchart illustrating a method for receiving a CSI-RS in a UE in a cellular CoMP radio communication system according to a fifth exemplary embodiment of the present invention.

FIG. 10 is a flowchart illustrating a method for receiving a CSI-RS in a UE in a cellular CoMP radio communication system according to a fifth exemplary embodiment of the present invention.

Referring to FIG. 10, the flowchart indicates a CSI-RS reception operation performed in a UE if a BS transmits measurement set information, and at least one of a RFN nf, an SFN offset δ, paging sub-frame period information, and paging SFN set information for each CSI-RS to the UE, and the UE receives a CSI-RS through a sub-frame except for a sub-frame which collides with a sub-frame through which a paging message, an SIB1 message, a PBCH signal, and a synchronization signal using the received information.

The UE receives measurement set information from the BS in step 1001. The UE determines a RFN offset Δnf, an SFN offset δ, and a paging cycle of a cell which allocates each CSI-RS resource included in a measurement set in step 1003. The RFN offset $\Delta n_f$ denotes a difference value between an RFN of a serving cell and a RFN of a cell which allocates each CSI-RS resource as a value for determining an RFN $n_f$ CSI-RS of the cell which allocates each CSI-RS resource. An RFN of a cell which allocates a particular CSI-RS resource may be calculated as expressed in Equation (2).

The SFN offset δ denotes a difference value between an SFN of the serving cell and an SFN used in a cell which allocates each CSI-RS resource.

The paging cycle denotes a cycle by which a paging sub-frame is set in a cell which allocates each CSI-RS resource. The BS transmits one of 6 paging cycles, i.e., 10 [ms], 20 [ms], 40 [ms], 80 [ms], 160 [ms] and 320 [ms] to the UE. A scheme informing the paging cycle may be a scheme in which the BS transmits the paging cycle using 3 bits, or a scheme in which the BS transmits a defaultPagingCycle and nB as a paging association parameter thereby the UE calculates the paging cycle itself.

The UE determines whether each CSI-RS transmission timing collides with a paging sub-frame in step 1005. The paging sub-frame may be set as one of {9}, {4, 9} and {0, 4, 5, 9} for each paging sub-frame period. The UE determines a paging sub-frame for each cell as described above with reference to FIGS. 6 to 8.

If each CSI-RS transmission timing collides with a paging sub-frame, the UE does not receive a CSI-RS through the collision sub-frame in step 1013. If no CSI-RS transmission timing collides with a paging sub-frame, the UE determines whether each CSI-RS transmission timing collides with a sub-frame through which an SIB message is transmitted in step 1007. If each CSI-RS transmission timing collides with the sub-frame through which the SIB message is transmitted, the UE does not receive a CSI-RS through the collision sub-frame in step 1013.

If no CSI-RS transmission timing collides with the sub-frame through which the SIB message is transmitted, the UE determines whether a time-frequency resource through which each CSI-RS is transmitted collides with a resource through which one of a PBCH signal and a synchronization signal is transmitted in step 1009. If the time-frequency resource through which each CSI-RS is transmitted collides with the resource through which one of the PBCH signal and the synchronization signal is transmitted, the UE does not receive a CSI-RS through the collision sub-frame in step 1013. If the time-frequency resource through which each CSI-RS is transmitted does not collide with the resource through which one of the PBCH signal and the synchronization signal is transmitted, the UE receives a CSI-RS in step 1011.

Figure 11:
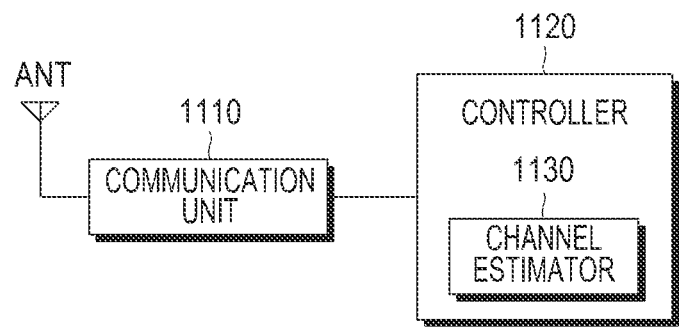
FIG. 11 schematically illustrates an internal structure of a UE in a cellular CoMP radio communication system according to an exemplary embodiment of the present invention.

FIG. 11 schematically illustrates an internal structure of a UE in a cellular CoMP radio communication system according to an exemplary embodiment of the present invention.

Referring to FIG. 11, a UE includes a communication unit 1110 and a controller 1120. The communication unit 1110 transmits data to an external device, or receives data from an external device. The communication unit 1110 may estimate channel status and transmit the estimated channel status information to a CCA in order to use a CoMP scheme under a control of the controller 1120.

The controller 1120 controls the overall operation of the UE, and performs a CSI-RS reception operation as described above with reference to FIGS. 4 to 10. The controller 1120 controls a channel estimation timing of a channel estimator 1130 by determining or calculating each CSI-RS reception timing and each CSI-RS reception prevention timing based on received measurement set information. The channel estimator 1130 detects measurement set information and information related to the CSI-RS transmission received from the CCA, and estimates channel status using received CSI-RS based on the measurement set information and information related to the CSI-RS transmission.

In FIG. 11, the UE includes the communication unit 1110 and the controller 1120. However, it will be understood by those of ordinary skill in the art that the UE may include additional units, such as a display for displaying current state of the UE, an input unit for inputting data from a user of the UE, a storage unit for storing data generated in the UE, and the like.

While the communication unit 1110 and the controller 1120 are shown in FIG. 11 as separate units, it is to be understood that this is for merely convenience of description. In other words, the communication unit 1110 and the controller 1120 may be incorporated into a single unit.

Figure 12:
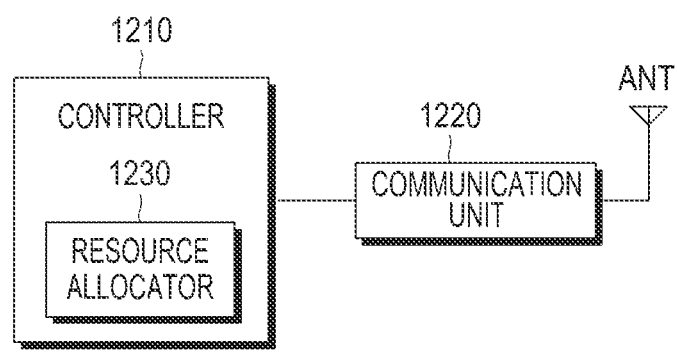
FIG. 12 schematically illustrates an internal structure of a CCA in a cellular CoMP radio communication system according to an exemplary embodiment of the present invention.

FIG. 12 schematically illustrates an internal structure of a CCA in a cellular CoMP radio communication system according to an exemplary embodiment of the present invention.

Referring to FIG. 12, a CCA includes a controller 1210 and a communication unit 1220. The controller 1210 controls status and an operation of the CCA in order that a UE receives CSI-RS for channel estimation as described above with reference to FIGS. 4 to 10. The controller 1210 allocates a CSI-RS for each cell to each CSI-RS resource, and transmits CSI-RS reception prevention information to the UE. The controller 1210 may further include a resource allocator 1230 for allocating a CSI-RS resource for each cell and transmitting information related to the allocated CSI-RS resource.

The resource allocator 1230 allocates a resource and a timing for a CSI-RS transmission in order that the UE estimates channel status for each cell, and transmits a CSI-RS at a related CSI-RS transmission timing using a related CSI-RS transmission resource. The resource allocator 1230 allocates a resource in order to correspond to a CSI-RS for channel estimation of each cell.

The communication unit 1220 transmits/receives data to/from the UE or a cell managed by the CCA. The communication unit 1220 transmits a CSI-RS at a predetermined timing to the UE using an allocated resource under the control of the controller 1210.

While the controller 1210 and the communication unit 1220 are shown in FIG. 12 as separate units, it is to be understood that this is for merely convenience of description. In other words, the controller 1210 and the communication unit 1220 may be incorporated into a single unit.

As is apparent from the foregoing description, exemplary embodiments of the present invention enable a reference signal transmission information transmission/reception in a cellular radio communication system. Exemplary embodiments of the present invention enable a reference signal transmission information transmission/reception in a cellular radio communication system in which a signal reception apparatus receives a reference signal at a timing which does not collide with a timing at which a paging message is transmitted. Exemplary embodiments of the present invention enable a reference signal transmission information transmission/reception in a cellular radio communication system in which a signal reception apparatus receives a reference signal at a timing which does not collide with a timing at which system information is transmitted. Exemplary embodiments of the present invention enable a reference signal transmission information transmission/reception in a cellular radio communication system in which a signal reception apparatus receives a reference signal at a timing which does not collide with a timing at which a synchronization signal is transmitted. Exemplary embodiments of the present invention enable a reference signal transmission information transmission/reception in a cellular radio communication system in which a signal reception apparatus receives a reference signal at a timing which does not collide with a timing at which a Physical Broadcast CHannel (PBCH) signal is transmitted.

Exemplary embodiments of the present invention enable a transmission/reception for reference signal transmission information on reference signals transmitted by a plurality of signal transmission apparatuses in a cellular radio communication system. Exemplary embodiments of the present invention enable a reference signal transmission information transmission/reception in a cellular radio communication system in which a signal reception apparatus receives reference signals transmitted by a plurality of signal transmission apparatuses at a timing which does not collide with a timing at which a paging message is transmitted. Exemplary embodiments of the present invention enable a reference signal transmission information transmission/reception in a cellular radio communication system in which a signal reception apparatus receives reference signals transmitted by a plurality of signal transmission apparatuses at a timing which does not collide with a timing at which system information is transmitted. Exemplary embodiments of the present invention enable a reference signal transmission information transmission/reception in a cellular radio communication system in which a signal reception apparatus receives reference signals transmitted by a plurality of signal transmission apparatuses at a timing which does not collide with a timing at which a synchronization signal is transmitted. Exemplary embodiments of the present invention enable a reference signal transmission information transmission/reception in a cellular radio communication system in which a signal reception apparatus receives reference signals transmitted by a plurality of signal transmission apparatuses at a timing which does not collide with a timing at which a PBCH signal is transmitted.

Exemplary embodiments of the present invention enable a reference signal reception at a timing which does not collide with a timing at which a paging message is transmitted in a cellular radio communication system. Exemplary embodiments of the present invention enable a reference signal reception at a timing which does not collide with a timing at which a synchronization signal is transmitted in a cellular radio communication system. Exemplary embodiments of the present invention enable a reference signal reception at a timing which does not collide with a timing at which a PBCH signal is transmitted in a cellular radio communication system.

Exemplary embodiments of the present invention enable a reception for each reference signal transmitted by a plurality of signal transmission apparatuses in a cellular radio communication system. Exemplary embodiments of the present invention enable a reception for reference signals transmitted by a plurality of signal transmission apparatuses at a timing which does not collide with a timing at which a paging message is transmitted in a cellular radio communication system. Exemplary embodiments of the present invention enable a reception for reference signals transmitted by a plurality of signal transmission apparatuses at a timing which does not collide with a timing at which system information is transmitted in a cellular radio communication system. Exemplary embodiments of the present invention enable a reception for reference signals transmitted by a plurality of signal transmission apparatuses at a timing which does not collide with a timing at which a synchronization signal is transmitted in a cellular radio communication system. Exemplary embodiments of the present invention enable a reception for reference signals transmitted by a plurality of signal transmission apparatuses at a timing which does not collide with a timing at which a PBCH signal is transmitted in a cellular radio communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting reference signal transmission information, the method comprising:
   transmitting measurement set information related to a measurement set including at least one reference signal resource unit on which a reference signal is transmitted, and reference signal transmission timing information including information related to a timing at which the reference signal is transmitted to a User Equipment (UE); and
   transmitting reference signal non-transmission timing information including information related to a timing at which the reference signal is not transmitted on the at least one reference signal resource unit to the UE,
   wherein the reference signal non-transmission timing information includes at least a Sub-Frame Number (SFN) offset value from an SFN used in a cell which the UE accesses.

2. The method as claimed in claim 1, wherein, if the cellular radio communication system using a Cooperative Multi-Point (CoMP) scheme is a Long Term Evolution Advanced (LTE-A) mobile communication system, the reference signal non-transmission timing information includes information related to a timing at which at least one of a synchronization signal, a Physical Broadcast CHannel (PBCH) signal, a System Information Block type 1 (SIB1) message, a paging message, and an SIB2 message to an SIB13 message is transmitted.

3. The method as claimed in claim 2, wherein the measurement set includes reference signal resource units which each cell providing a service to the UE using the CoMP scheme allocates.

4. The method as claimed in claim 3, wherein the SFN offset value indicates a difference value between the SFN used in a cell which the UE accesses and an SFN used in a cell which allocates each of the reference signal resource units.

5. The method as claimed in claim 3, wherein the reference signal non-transmission timing information includes information related to a Radio Frame Number (RFN) offset as a difference value between an RFN used in a cell which the UE accesses and an RFN used in a cell which allocates each of the reference signal resource units.

6. The method as claimed in claim 3, wherein the reference signal non-transmission timing information includes information related to a cell identifier of a cell which allocates each of the reference signal resource units.

7. The method as claimed in claim 3, wherein the reference signal non-transmission timing information includes information indicating that a reference signal transmitted on each of the reference signal resource units is a reference signal transmitted from a cell which the UE accesses or indicating that the reference signal transmitted on each of the reference signal resource units is a reference signal transmitted from a neighbor cell of the cell which the UE accesses.

8. The method as claimed in claim 3, wherein the reference signal non-transmission timing information includes information related to at least one of a paging cycle by which a paging message is transmitted in a cell allocating each of the reference signal resource units and paging additional information.

9. The method as claimed in claim 3, wherein the reference signal non-transmission timing information includes information related to a paging Sub-Frame Number (SFN) set including paging SFNs of paging sub-frames on which a paging message is transmitted in a cell allocating each of the reference signal resource units.

10. The method as claimed in claim 3, wherein the reference signal non-transmission timing information includes information related to a system information window length (si-WindowLength) parameter as information related to a size of a time window on which an SIB2 message to an SIB13 message are transmitted and a system information period (si-Periodicity) parameter as information related to a period by which the SIB2 message to the SIB13 message are transmitted.

11. The method as claimed in claim 3, wherein the reference signal non-transmission timing information includes information related to reference signal resource units on which the reference signal is not transmitted among the reference signal resource units.

12. The method as claimed in claim 1, wherein, if the cellular radio communication system using a Cooperative Multi-Point (CoMP) scheme is a Long Term Evolution Advanced (LTE-A) mobile communication system, the reference signal is a Channel Status Information Reference Signal (CSI-RS).

13. The method as claimed in claim 1, wherein the measurement set information includes information related to a reference signal resource unit identifier of each of the reference signal resource units included in the measurement set.

14. A method for receiving reference signal transmission information, the method comprising:

receiving measurement set information related to a measurement set including at least one reference signal resource unit on which a reference signal is transmitted, and reference signal transmission timing information including information related to a timing at which the reference signal is transmitted from a network entity; and receiving non-transmission timing information including information related to a timing at which the reference signal is not transmitted on the at least one reference signal resource unit from the network entity, wherein the reference signal non-transmission timing information includes at least a Sub-Frame Number (SFN) offset value from an SFN used in a cell which the UE accesses.

15. The method as claimed in claim 14, wherein, if the cellular radio communication system using a Cooperative Multi-Point (CoMP) scheme is a Long Term Evolution Advanced (LTE-A) mobile communication system, the reference signal non-transmission timing information includes information related to a timing at which at least one of a synchronization signal, a Physical Broadcast CHannel (PBCH) signal, a System Information Block type 1 (SIB1) message, a paging message, and an SIB2 message to an SIB13 message is transmitted.

16. The method as claimed in claim 15, wherein the measurement set includes reference signal resource units which each cell providing a service to the UE using the CoMP scheme allocates.

17. The method as claimed in claim 16, wherein the SFN offset value indicates a difference value between the SFN used in a cell which the UE accesses and an SFN used in a cell which allocates each of the reference signal resource units.

18. The method as claimed in claim 16, wherein the reference signal non-transmission timing information includes information related to a Radio Frame Number (RFN) offset as a difference value between an RFN used in a cell which the UE accesses and an RFN used in a cell which allocates each of the reference signal resource units.

19. The method as claimed in claim 16, wherein the reference signal non-transmission timing information includes information related to a cell identifier of a cell which allocates each of the reference signal resource units.

20. The method as claimed in claim 16, wherein the reference signal non-transmission timing information includes information indicating that a reference signal transmitted on each of the reference signal resource units is a reference signal transmitted from a cell which the UE accesses or indicating that the reference signal transmitted on each of the reference signal resource units is a reference signal transmitted from a neighbor cell of the cell which the UE accesses.

21. The method as claimed in claim 16, wherein the reference signal non-transmission timing information includes information related to at least one of a paging cycle by which a paging message is transmitted in a cell allocating each of the reference signal resource units and paging additional information.

22. The method as claimed in claim 16, wherein the reference signal non-transmission timing information includes information related to a paging Sub-Frame Number (SFN) set including paging SFNs of paging sub-frames on which a paging message is transmitted in a cell allocating each of the reference signal resource units.

23. The method as claimed in claim 16, wherein the reference signal non-transmission timing information includes information related to a system information window length (si-WindowLength) parameter as information related to a size of a time window on which an SIB2 message to an SIB13 message are transmitted and a system information period (si-Periodicity) parameter as information related to a period by which the SIB2 message to the SIB13 message are transmitted.

24. The method as claimed in claim 16, wherein the reference signal non-transmission timing information includes information related to reference signal resource units on which the reference signal is not transmitted among the reference signal resource units.

25. The method as claimed in claim 14, wherein, if the cellular radio communication system using a Cooperative Multi-Point (CoMP) scheme is a Long Term Evolution Advanced (LTE-A) mobile communication system, the reference signal is a Channel Status Information Reference Signal (CSI-RS).

26. The method as claimed in claim 14, wherein the measurement set information includes information related to a reference signal resource unit identifier of each of the reference signal resource units included in the measurement set.

27. A network entity in a cellular radio communication system, comprising:
a communication unit configured to transmit measurement set information related to a measurement set including at least one reference signal resource unit on which a reference signal is transmitted, and reference signal transmission timing information including information related to a timing at which the reference signal is transmitted to a User Equipment (UE), and to transmit reference signal non-transmission timing information including information related to a timing at which the reference signal is not transmitted on the at least one reference signal resource unit to the UE,
wherein the reference signal non-transmission timing information includes at least a Sub-Frame Number (SFN) offset value from an SFN used in a cell which the UE accesses.

28. The network entity as claimed in claim 27, wherein, if the cellular radio communication system using a Cooperative Multi-Point (CoMP) scheme is a Long Term Evolution Advanced (LTE-A) mobile communication system, the reference signal non-transmission timing information includes information related to a timing at which at least one of a synchronization signal, a Physical Broadcast CHannel (PBCH) signal, a System Information Block type 1 (SIB1) message, a paging message, and an SIB2 message to an SIB13 message is transmitted.

29. The network entity as claimed in claim 28, wherein the measurement set includes reference signal resource units which each cell providing a service to the UE using the CoMP scheme allocates.

30. The network entity as claimed in claim 29, wherein the SFN offset values indicates a difference value between the SFN used in a cell which the UE accesses and an SFN used in a cell which allocates each of the reference signal resource units.

31. The network entity as claimed in claim 29, wherein the reference signal non-transmission timing information includes information related to a Radio Frame Number (RFN) offset as a difference value between an RFN used in a cell which the UE accesses and an RFN used in a cell which allocates each of the reference signal resource units.

32. The network entity as claimed in claim 29, wherein the reference signal non-transmission timing information includes information related to a cell identifier of a cell which allocates each of the reference signal resource units.

33. The network entity as claimed in claim 29, wherein the reference signal non-transmission timing information includes information indicating that a reference signal transmitted on each of the reference signal resource units is a reference signal transmitted from a cell which the UE accesses or indicating that the reference signal transmitted on each of the reference signal resource units is a reference signal transmitted from a neighbor cell of the cell which the UE accesses.

34. The network entity as claimed in claim 29, wherein the reference signal non-transmission timing information includes information related to at least one of a paging cycle by which a paging message is transmitted in a cell allocating each of the reference signal resource units and paging additional information.

35. The network entity as claimed in claim 29, wherein the reference signal non-transmission timing information includes information related to a paging Sub-Frame Number (SFN) set including paging SFNs of paging sub-frames on which a paging message is transmitted in a cell allocating each of the reference signal resource units.

36. The network entity as claimed in claim 29, wherein the reference signal non-transmission timing information includes information related to a system information window length (si-WindowLength) parameter as information related to a size of a time window on which an SIB2 message to an SIB13 message are transmitted and a system information period (si-Periodicity) parameter as information related to a period by which the SIB2 message to the SIB13 message are transmitted.

37. The network entity as claimed in claim 29, wherein the reference signal non-transmission timing information includes information related to reference signal resource units on which the reference signal is not transmitted among the reference signal resource units.

38. The network entity as claimed in claim 27, wherein, if the cellular radio communication system using a Cooperative Multi-Point (CoMP) scheme is a Long Term Evolution Advanced (LTE-A) mobile communication system, the reference signal is a Channel Status Information Reference Signal (CSI-RS).

39. The network entity as claimed in claim 27, wherein the measurement set information includes information related to a reference signal resource unit identifier of each of the reference signal resource units included in the measurement set.

40. A User Equipment (UE) in a cellular radio communication system, the system comprising:
a communication unit configured to receive measurement set information related to a measurement set including at least one reference signal resource unit on which a reference signal is transmitted, and reference signal transmission timing information including information related to a timing at which the reference signal is transmitted from a network entity, and to receiving non-transmission timing information including information related to a timing at which the reference signal is not transmitted on the at least one reference signal resource unit from the network entity,
wherein the reference signal non-transmission timing information includes at least a Sub-Frame Number (SFN) offset value from an SFN used in a cell which the UE accesses.

41. The UE as claimed in claim 40, wherein, if the cellular radio communication system using a Cooperative Multi-Point (CoMP) scheme is a Long Term Evolution Advanced (LTE-A) mobile communication system, the reference signal non-transmission timing information includes information related to a timing at which at least one of a synchronization signal, a Physical Broadcast CHannel (PBCH) signal, a System Information Block type 1 (SIB1) message, a paging message, and an SIB2 message to an SIB13 message is transmitted.

42. The UE as claimed in claim 41, wherein the measurement set includes reference signal resource units which each cell providing a service to the UE using the CoMP scheme allocates.

43. The UE as claimed in claim 42, wherein the SFN offset value indicates a difference value between the SFN used in a cell which the UE accesses and an SFN used in a cell which allocates each of the reference signal resource units.

44. The UE as claimed in claim 42, wherein the reference signal non-transmission timing information includes information related to a Radio Frame Number (RFN) offset as a difference value between a RFN used in a cell which the UE accesses and a RFN used in a cell which allocates each of the reference signal resource units.

45. The UE as claimed in claim 42, wherein the reference signal non-transmission timing information includes information related to a cell identifier of a cell which allocates each of the reference signal resource units.

46. The UE as claimed in claim 42, wherein the reference signal non-transmission timing information includes information indicating that a reference signal transmitted on each of the reference signal resource units is a reference signal transmitted from a cell which the UE accesses or indicating that the reference signal transmitted on each of the reference signal resource units is a reference signal transmitted from a neighbor cell of the cell which the UE accesses.

47. The UE as claimed in claim 42, wherein the reference signal non-transmission timing information includes information related to at least one of a paging cycle by which a paging message is transmitted in a cell allocating each of the reference signal resource units and paging additional information.

48. The UE as claimed in claim 42, wherein the reference signal non-transmission timing information includes information related to a paging Sub-Frame Number (SFN) set including paging SFNs of paging sub-frames on which a paging message is transmitted in a cell allocating each of the reference signal resource units.

49. The UE as claimed in claim 42, wherein the reference signal non-transmission timing information includes information related to a system information window length (si-WindowLength) parameter as information related to a size of a time window on which an SIB2 message to an SIB13 message are transmitted and a system information period (si-Periodicity) parameter as information related to a period by which the SIB2 message to the SIB13 message are transmitted.

50. The UE as claimed in claim 42, wherein the reference signal non-transmission timing information includes information related to reference signal resource units on which the reference signal is not transmitted among the reference signal resource units.

51. The UE as claimed in claim 40, wherein, if the cellular radio communication system using a Cooperative Multi-Point (CoMP) scheme is a Long Term Evolution Advanced (LTE-A) mobile communication system, the reference signal is a Channel Status Information Reference Signal (CSI-RS).

52. The UE as claimed in claim 40, wherein the measurement set information includes information related to a reference signal resource unit identifier of each of the reference signal resource units included in the measurement set.

\* \* \* \* \*